United States Patent
Hanada et al.

(10) Patent No.: US 10,066,048 B2
(45) Date of Patent: Sep. 4, 2018

(54) SELF-CROSSLINKABLE POLYHYDROXY POLYURETHANE RESIN, RESINACEOUS MATERIAL THAT CONTAINS THE RESIN, PROCESS FOR PRODUCTION OF THE RESIN, AND IMITATION LEATHER, SURFACING MATERIAL AND WEATHERSTRIP MATERIAL, USING THE RESIN

(75) Inventors: Kazuyuki Hanada, Tokyo (JP); Kazuya Kimura, Tokyo (JP); Kenichi Takahashi, Tokyo (JP); Osamu Kawakami, Tokyo (JP); Manabu Uruno, Tokyo (JP)

(73) Assignees: DAINICHISEIKA COLOR & CHEMICALS MFG. CO., LTD., Tokyo (JP); UKIMA CHEMICALS & COLOR MFG. CO., LTD., Tokyo (JP)

( * ) Notice: Subject to any disclaimer, the term of this patent is extended or adjusted under 35 U.S.C. 154(b) by 656 days.

(21) Appl. No.: 13/805,970

(22) PCT Filed: Jun. 21, 2011

(86) PCT No.: PCT/JP2011/064132
§ 371 (c)(1), (2), (4) Date: Dec. 20, 2012

(87) PCT Pub. No.: WO2011/162237
PCT Pub. Date: Dec. 29, 2011

(65) Prior Publication Data
US 2013/0095715 A1    Apr. 18, 2013

(30) Foreign Application Priority Data

| Jun. 24, 2010 | (JP) | 2010-143813 |
| Jun. 24, 2010 | (JP) | 2010-143883 |
| Jul. 29, 2010 | (JP) | 2010-170817 |
| Jul. 29, 2010 | (JP) | 2010-170818 |

(51) Int. Cl.

| C08G 18/80 | (2006.01) |
| B32B 27/12 | (2006.01) |
| B32B 27/32 | (2006.01) |
| B32B 27/40 | (2006.01) |
| C08G 18/79 | (2006.01) |
| C08G 71/04 | (2006.01) |
| C09D 175/04 | (2006.01) |
| D06N 3/14 | (2006.01) |

(52) U.S. Cl.
CPC ............ *C08G 18/807* (2013.01); *B32B 27/12* (2013.01); *B32B 27/32* (2013.01); *B32B 27/40* (2013.01); *C08G 18/792* (2013.01); *C08G 18/8022* (2013.01); *C08G 18/8025* (2013.01); *C08G 18/8029* (2013.01); *C08G 18/8074* (2013.01); *C08G 18/8077* (2013.01); *C08G 71/04* (2013.01); *C09D 175/04* (2013.01); *D06N 3/14* (2013.01); *D06N 2211/28* (2013.01); *Y10T 428/249921* (2015.04); *Y10T 428/31587* (2015.04); *Y10T 442/20* (2015.04)

(58) Field of Classification Search
CPC ......... B32B 27/12; B32B 27/40; C08G 71/04; C08G 18/8025; C08G 18/8029; D06N 211/28; D06N 3/14; Y10T 428/249921; Y10T 428/20
USPC ................................ 442/59; 428/424.8, 221
See application file for complete search history.

(56) References Cited

U.S. PATENT DOCUMENTS

| 3,072,613 A | 1/1963 | Whelan et al. |
| 4,299,868 A * | 11/1981 | Berndt ................... C08G 18/10 427/389 |
| 4,480,009 A | 10/1984 | Berger |
| 4,484,994 A | 11/1984 | Jacobs, III et al. |

(Continued)

FOREIGN PATENT DOCUMENTS

| EP | 390777 | 10/1990 |
| EP | 1143063 | 10/2001 |

(Continued)

OTHER PUBLICATIONS

Kihara et al.: "Catalytic Activity of Various Salts in the Reaction of 2,3-Epoxypropyl Phenyl Ether and Carbon Dioxide under Atomospheric Pressure", J. Org. Chem. 1993, 58, pp. 6198-6202 (1993).

(Continued)

*Primary Examiner* — Vincent Tatesure
(74) *Attorney, Agent, or Firm* — Hamre, Schumann, Mueller & Larson, P.C.

(57) ABSTRACT

Provided are a self-crosslinking polyhydroxy polyurethane resin derived from a reaction of a 5-membered cyclic carbonate compound and an amine compound and having masked isocyanate groups in its structure; a process for producing the resin; an imitation leather composed of a base fabric and a resin composition composed of the resin as its principal component and impregnated in or laminated on the base fabric; as kin material made of a thermoplastic polyolefin resin, said skin material including a thermoplastic polyolefin resin sheet and a top coat layer formed directly or via a primer layer on the sheet, wherein the top coat layer has been formed with a resin composition composed of the resin as its principal component; and a weather strip material composed, as its principal components, of the resin and a specific diorganopolysiloxane and/or a silicone oil.

16 Claims, No Drawings

(56) References Cited

U.S. PATENT DOCUMENTS

| | | |
|---|---|---|
| 4,499,149 A | 2/1985 | Berger |
| 4,520,167 A | 5/1985 | Blank et al. |
| 4,631,320 A | 12/1986 | Perekh et al. |
| 4,758,632 A | 7/1988 | Perekh et al. |
| 4,806,611 A | 2/1989 | Honel et al. |
| 4,883,854 A | 11/1989 | Coury et al. |
| 4,895,829 A | 1/1990 | Hanada et al. |
| 4,897,435 A | 1/1990 | Jacobs, III et al. |
| 4,910,087 A | 3/1990 | Torii et al. |
| 5,237,021 A | 8/1993 | Ishii et al. |
| 5,324,797 A | 6/1994 | Ishii et al. |
| 5,606,077 A | 2/1997 | Lersch et al. |
| 5,686,547 A | 11/1997 | Nye |
| 6,120,905 A | 9/2000 | Figovsky |
| 6,379,751 B1 | 4/2002 | Schäfer et al. |
| 6,784,300 B2 | 8/2004 | Cetin et al. |
| 2003/0198819 A1 | 10/2003 | Reusmann et al. |
| 2006/0276599 A1 | 12/2006 | DeWitt et al. |
| 2007/0059597 A1 | 3/2007 | Nakanishi et al. |
| 2007/0134502 A1 | 6/2007 | Fonda |
| 2007/0135588 A1 | 6/2007 | Diakoumakos et al. |
| 2008/0026154 A1 | 1/2008 | Jones et al. |
| 2009/0018302 A1 | 1/2009 | Laas et al. |
| 2010/0210809 A1 | 8/2010 | Simon et al. |
| 2011/0039948 A1 | 2/2011 | Lange et al. |
| 2012/0231184 A1 | 9/2012 | Hanada et al. |
| 2012/0232289 A1 | 9/2012 | Hanada et al. |
| 2012/0237701 A1 | 9/2012 | Hanada et al. |
| 2013/0171896 A1 | 7/2013 | Hanada et al. |
| 2014/0024274 A1 | 1/2014 | Hanada et al. |

FOREIGN PATENT DOCUMENTS

| | | |
|---|---|---|
| EP | 2102286 | 9/2009 |
| EP | 2505600 | 10/2012 |
| EP | 2610276 | 7/2013 |
| JP | 58-13359 | 1/1980 |
| JP | 56-004408 | 1/1981 |
| JP | 61-227087 | 10/1986 |
| JP | 62-202786 | 9/1987 |
| JP | 63-166854 | 7/1988 |
| JP | 2-102096 | 4/1990 |
| JP | 3-501121 | 3/1991 |
| JP | 5-65341 | 3/1993 |
| JP | 06-025604 | 2/1994 |
| JP | 06-247151 | 9/1994 |
| JP | 7-10991 | 1/1995 |
| JP | 8-109349 | 4/1996 |
| JP | 8-225670 | 9/1996 |
| JP | 8-245787 | 9/1996 |
| JP | 8-245791 | 9/1996 |
| JP | 9-278982 | 10/1997 |
| JP | 10-67857 | 3/1998 |
| JP | 10-251405 | 9/1998 |
| JP | 11-140182 | 5/1999 |
| JP | 2000-319504 | 11/2000 |
| JP | 2001-234071 | 8/2001 |
| JP | 2002-114936 | 4/2002 |
| JP | 2002-518532 | 6/2002 |
| JP | 2004-051901 | 2/2004 |
| JP | 2005-154580 | 6/2005 |
| JP | 2005-336637 | 12/2005 |
| JP | 2006-176615 | 7/2006 |
| JP | 2006-307015 | 11/2006 |
| JP | 2006-336015 | 12/2006 |
| JP | 2007-501886 | 2/2007 |
| JP | 2007-77075 | 3/2007 |
| JP | 2007-270373 | 10/2007 |
| JP | 2007-297544 | 11/2007 |
| JP | 2008-502765 | 1/2008 |
| JP | 2008-056772 | 3/2008 |
| JP | 2008-297552 | 12/2008 |
| JP | 2009-30050 | 2/2009 |
| JP | 2009-520082 | 5/2009 |
| JP | 2009-144313 | 7/2009 |
| JP | 2009-155407 | 7/2009 |
| JP | 2010-180363 | 8/2010 |
| JP | 2011-132509 | 7/2011 |
| KR | 1986-0002192 | 12/1986 |
| WO | 1989/000565 | 1/1989 |
| WO | 2008/142109 | 11/2008 |
| WO | 2009/112418 | 9/2009 |
| WO | 2011/065129 | 6/2011 |
| WO | 2011/065432 | 6/2011 |
| WO | 2011/065433 | 6/2011 |
| WO | 2011/162237 | 12/2011 |
| WO | 2012/026338 | 3/2012 |

OTHER PUBLICATIONS

Kihara et al.: Synthesis and Properties of Poly (hydroxyurethane)s, Journal of Polymer Science: Part A: Polymer Chemistry vol. 31, pp. 2765-2773 (1993).

Extended European Search Report, Mar. 25, 2015; European Patent Application No. 11798121.7 (4 pages).

Zhu et al: "New polysiloxanes bearing cyclic carbonate side chains: synthesis and ionic conductivity studies"; Polymer Preprints (1994) vol. 35, No. 1, p. 496-497—2 pages.

Zhu et al.: "Synthesis of Polysiloxanes Bearing Cyclic Carbonate Side Chains. Dielectric Properties and Ionic Conductivities of Lithium Triflate Complexes"; Macromolecules (1994) vol. 27, No. 15, p. 4076-4079—4 pages.

Lang et al. (2009): STN International HCAPLUS database, Columbus (OH), accession No. 2009: 1141958.

Extended European Search Report, issued in the corresponding European Patent Application No. 11819802.7, dated Oct. 25, 2016, 5 pages.

Indian Office Action, issued in the corresponding Indian Patent Application No. 370/KOLNP/2013, dated Jul. 28, 2017, 5 pages.

\* cited by examiner

US 10,066,048 B2

SELF-CROSSLINKABLE POLYHYDROXY POLYURETHANE RESIN, RESINACEOUS MATERIAL THAT CONTAINS THE RESIN, PROCESS FOR PRODUCTION OF THE RESIN, AND IMITATION LEATHER, SURFACING MATERIAL AND WEATHERSTRIP MATERIAL, USING THE RESIN

TECHNICAL FIELD

This invention relates to a novel self-crosslinking polyhydroxy polyurethane resin, a resin material containing the resin and a production process of the resin. More specifically, the present invention is concerned with a technology for providing a self-crosslinking polyhydroxy polyurethane resin, which can provide products excellent in abrasion resistance, chemical resistance and heat resistance when employed as a base material for film and molding materials, various coating materials, diverse paints and miscellaneous binders, and moreover, which is also useful from the viewpoint of preventing destruction of the global environment because carbon dioxide is used as a production raw material and can be fixed in the resin.

The present invention also relates to an imitation leather obtained by using a resin composition containing the above-described self-crosslinking polyhydroxy polyurethane resin as a principal component, and more specifically to an imitation leather excellent in scratch resistance, abrasion resistance, chemical resistance and heat resistance, and moreover, useful from the viewpoint of conservation of the global environment because the resin as the principal component contains carbon dioxide fixed in its structure.

The present invention also relates to a skin material, which is made of a thermoplastic polyolefin resin and is useful in a car interior trim material, home electric appliance component or part, or the like. More specifically, the present invention is also concerned with a skin material made of a thermoplastic polyolefin resin. Owing to the use of the above-described self-crosslinking polyhydroxy polyurethane resin in the formation of a top coat layer for the skin material, the skin material is excellent in scratch resistance, abrasion resistance, chemical resistance and heat resistance, and the top coat layer can be provided as a uniform matte film as needed.

The present invention also relates to a weather strip material, which is useful in the formation of a surface treatment layer for a strip-shaped sealing part made of a high-molecular elastomer material and adapted to prevent wind, rain and/or the like from penetrating through a gap between a structure body and a part such as at a door, window casing or the like of a car, building or the like. More specifically, the formation of a surface treatment layer with a material, which makes use of the above-described self-crosslinking polyhydroxy polyurethane resin, at a slide contact portion of a weather strip of a high-molecular elastomer material as a base material, where the weather strip is to be brought into sliding contact with another part, can provide the surface treatment layer especially with excellent lubricity, abrasion resistance, heat resistance and weatherability, and moreover, the surface treatment layer is useful from the standpoint of environmental conservation properties too.

BACKGROUND ART

Polyhydroxy polyurethane resins, which make use of carbon dioxide as a production raw material, are known for some time (see, for example, Patent Documents 1 and 2). Under the current situation, however, the development of their applications has not moved ahead, because these polyhydroxy polyurethane resins are evidently inferior in characteristics to polyurethane-based resins comparable as high-molecular compounds of similar type.

On the other hand, the global warming phenomenon which can be considered to be attributable to the ever-increasing emission of carbon dioxide has become a worldwide problem in recent years, and a reduction in carbon dioxide emissions has arisen as a critical issue for the entire world. The change to renewable resources such as biomass and methane has also become a worldwide trend from the viewpoint of the problem of exhaustible fossil resources (petroleum) (for example, Non-patent Documents 1 and 2).

Under the above-described background, the present inventors put a fresh look on the above-described polyhydroxy polyurethane resins, and have come to realize that the provision of a technology capable of enabling the development of applications of those resins is very effective. Described specifically, carbon dioxide which is a raw material for such polyhydroxy polyurethane resins is a readily-available and sustainable carbon resource, and the provision of a technology that makes effective use of a resin, in which carbon dioxide used as a raw material is fixed, can find utility as an effective means for resolving serious problems such as warming, resource depletion and the like which the earth confronts in recent years. The use, if possible, of a polyhydroxy polyurethane resin, which contains carbon dioxide fixed therein, in the below-described products will be extremely effective because these products are used in large quantities.

(Imitation Leathers)

Conventionally, imitation leathers have been used in pouches, bags, shoes, furniture, clothing, vehicle interior trim materials, electric appliances, and the like. As resins for these imitation leathers, polyurethane-based resins are widely used. The term "imitation leather" is a generic term for leather-like products manufactured resembling natural leathers. In general, imitation leathers can be roughly divided into artificial leathers, synthetic leathers, and vinyl chloride leathers.

Artificial leathers have a structure closest to that of natural leathers among imitation leathers, and use a non-woven fabric as a base fabric. As a process for the production of a general artificial leather, there is a process to be described hereinafter. After a nonwoven fabric is first impregnated with a solution of a polyurethane-based resin in dimethylformamide (DMF), the polyurethane-based resin is solidified and dried into a porous form by wet-process film formation (submerged solidification). Subsequently, its surface is further coated with a polyurethane-based resin or provided with a laminated layer of the polyurethane-based resin to present a smooth tone, or its surface is ground to raise fibers such that a suede tone is presented.

On the other hand, synthetic leathers use, as a base fabric, a fabric such as a woven fabric or raised blanket, and in general, are roughly divided into dry-process synthetic leathers and wet-process synthetic leathers. For the production of a dry-process synthetic leather, there are two processes, one being to coat a polyurethane-based resin directly on a base fabric and to dry it, and the other to coat a polyurethane-based resin on a sheet of release paper, to dry the polyurethane-based resin into a film, and then to bond the film and a base fabric together with an adhesive. On the other hand, a wet-process synthetic leather can be produced by impregnating or coating a base fabric with the above-mentioned solution of the polyurethane-based resin in DMF and then subjecting the polyurethane-based resin to submerged solidification and drying to form a porous layer. Further, the surface of the synthetic leather obtained by the dry process or wet process as described above is coated with a polyurethane-based resin or provided with a laminated layer of the polyurethane-based resin to present a smooth tone, or the surface is ground to raise fibers such that a suede tone is presented.

As mentioned above, the reduction of carbon dioxide emissions has become a critical worldwide issue. In the field of imitation leather products, more and more makers are also positively working on environmental measures, resulting in a move toward forming imitation leather products by using materials excellent in environmental conservation properties. A great deal of research is hence under way, for example, to reduce VOC (volatile organic compound) emissions as much as possible by using polyurethane-based resins, which are dispersible or emulsifiable in water-based media, in place of polyurethane resins that use an organic solvent, or to use plant-derived raw materials from the viewpoint of carbon neutral. However, the resulting imitation leather products are still different in performance compared with the conventional products, and therefore, are considered to have problems for practical applications. Moreover, these approaches are still insufficient in respect to the realization of the conservation of the current environment on the global scale (Patent Documents 3 to 5).

(Skin Materials Made of Thermoplastic Polyolefin Resins)

Concerning vehicle interior trim materials (instrument panels, door trims, etc.) and home electric appliance components and parts, the recycling of their constituent members is strongly desired to decrease waste materials as much as possible after use in view of the worsening garbage-related problems and environment-related problems in recent years. From this viewpoint, thermoplastic polyolefin resins, for example, polypropylene resin (hereinafter abbreviated as "PP resin"), ABS resin, AS resin, polyolefin-based thermoplastic elastomers (abbreviated as "TPO resins") and the like are used as materials for forming the above-described members. However, these thermoplastic polyolefin resins involve a problem in that they are inferior in surface adhesiveness, scratch resistance, abrasion resistance and chemical resistance in comparison with vinyl chloride resin and the like which have been conventionally used, and therefore, are required to impart functionality to their surfaces to lessen these problems. To realize artistry forgiving a high-grade appearance, or concerning car interior trim materials, in view of an attention to anti-glare properties for drivers, it is also practiced to apply various coatings to thermoplastic polyolefin base materials.

Conventionally proposed is a method that uses a chlorinated polypropylene resin, which has good adhesiveness to a base material of a polyolefin-based resin such as PP resin or a TPO resin, in a coating formulation to be employed in such coating applications. Described specifically, this method imparts functionality to the surface of a base material of a polyolefin-based resin, for example, by using a coating formulation, which makes use of a chlorinated polypropylene-modified acrylic resin as a binder and contains a matting agent such as an inorganic extender pigment (silica or talc) or acrylic resin particles added thereto, or by applying a chlorinated polypropylene-based primer and then applying a polyester resin or polyurethane resin on the primer.

Recently, there is an increasing consciousness towards the global environment. More and more makers are, therefore, positively working on environmental measures, resulting in a move toward forming such products by using materials excellent in environmental conservation properties. Active research is hence under way, for example, to avoid choosing specific solvents (toluene and the like) from organic solvents for use in the above-described coating formulations or to use water-based resins instead of organic solvents for reducing VOC (volatile organic compound) emissions as much as possible (see Patent Documents 6 to 8). However, these approaches are still insufficient for the conservation of the current environment on the global scale. As the reduction of carbon dioxide emissions has become a critical worldwide issue as mentioned above, the development and use, if possible, of a material making use of carbon dioxide as a raw material will be extremely effective.

(Weather Strip Materials)

As materials for forming weather strips such as glass runs, door weather strips, body side weather strips, inside seals and outside seals in cars and buildings, high-molecular elastomer materials such as chloroprene rubber, styrene-butadiene rubber, nitrile rubber and EPDM rubber have been used conventionally. It is a common practice to form surface treatment layers on the surfaces of these weather strips by a method such as coating or impregnation such that performance such as lubricity, abrasion resistance, mold release properties, heat resistance, water resistance and weatherability can be imparted.

As materials for forming such treatment layers, a variety of coating formulations have been proposed including one containing a thermosetting polyurethane resin and a silicone oil added thereto (see Patent Document 9), one containing a thermosetting polyurethane resin and an organopolysiloxane added thereto (see Patent Document 10), and one composed of a urethane prepolymer, a silicone oil, hydrophobic silica and a polyisocyanate (see Patent Document 11).

From an increasing consciousness towards environmental problems in recent years, on the other hand, more and more makers are positively working on environmental measures, resulting in a move toward forming products by using materials excellent in environmental conservation properties. Active research is hence under way, for example, to avoid choosing specific solvents (toluene and the like) from organic solvents for use in the above-described coating formulations or to use water-based resins instead of organic solvents for reducing VOC (volatile organic compound) emissions as much as possible (see Patent Document 12). However, these approaches are still insufficient for the conservation of the current environment on the global scale. As the reduction of carbon dioxide emissions has become a critical worldwide issue as mentioned above, the development and use, if possible, of a material making use of carbon dioxide as a raw material will be extremely effective.

Under such a background as described above, polyhydroxy polyurethane resins are drawing a fresh look again. Described specifically, carbon dioxide which is a raw material for these resins is a readily-available and sustainable carbon resource, and moreover, plastics that make use of carbon dioxide as a raw material can find utility as an effective means for resolving problems such as warming and resource depletion.

PRIOR ART DOCUMENTS

Patent Documents

Patent Document 1: U.S. Pat. No. 3,072,613
Patent Document 2: JP-A-2000-319504

Patent Document 3: JP-A-2009-144313
Patent Document 4: JP-A-2007-270373
Patent Document 5: JP-A-2005-154580
Patent Document 6: JP-A-2006-307015
Patent Document 7: JP-A-2004-51901
Patent Document 8: JP-A-2006-176615
Patent Document 9: JP-A-56-4408
Patent Document 10: JP-A-8-225670
Patent Document 11: JP-A-8-109349
Patent Document 12: JP-A-2008-56772

Non-Patent Documents

Non-patent Document 1: N. Kihara, T. Endo, J. Org. Chem., 58, 6198 (1993)
Non-patent Document 2: N. Kihara, T. Endo, J. Polymer Sci., Part A Polymer Chem., 31(12), 2765 (1993)

DISCLOSURE OF THE INVENTION

Problem to be Solved by the Invention

However, polyhydroxy polyurethane resins are evidently inferior in characteristics to polyurethane-based resins comparable as high-molecular compounds of similar type, and as an actual situation, the development of their applications has not moved ahead. To enable using polyhydroxy polyurethane resins for industrial applications, they, however, need to be provided with a new additional value, to say nothing of improved performance, so that they can be used like fossil plastics of similar type. Described specifically, there is an outstanding desire for the development of a resin improved in performance indispensable as an industrial material, such as still higher heat resistance, chemical resistance and abrasion resistance, in addition to the viewpoint of the protection of the global environment.

Therefore, a first object of the present invention is to provide a technology that makes it possible to effectively use, for industrial applications, polyhydroxy polyurethane resins, the development of applications of which has not moved ahead although they are considered to contribute to the resolution of problems such as global warming and resource depletion. More specifically, it is an object to provide a self-crosslinking polyhydroxy polyurethane resin, which is also sufficiently satisfactory in performances such as heat resistance, chemical resistance and abrasion resistance although products formed with the resin are responsive to the environment.

A second object of the present invention is to provide an imitation leather, which is not inferior to conventional imitation leather products, is excellent in surface scratch resistance, abrasion resistance, chemical resistance and heat resistance, and moreover, is also useful as an excellent environment-responsive product from the viewpoint of the conservation of the global environment, by using the newly-developed, self-crosslinking polyhydroxy polyurethane resin with carbon dioxide incorporated and fixed therein.

A third object of the present invention is to provide a skin material made of a thermoplastic polyolefin resin, which is excellent in surface scratch resistance, abrasion resistance, chemical resistance and heat resistance, more preferably is also excellent in uniform matting effect, enables to use a material with carbon dioxide incorporated therein, can contribute to the reduction of global greenhouse gas and can serve as an environment-responsive product, by using the newly-developed, self-crosslinking polyhydroxy polyurethane resin. It is to be noted that the term "a skin material made of a thermoplastic polyolefin resin" means one obtained by forming a top coat layer directly or via a primer layer on a surface of a sheet-shaped base material made of a thermoplastic polyolefin resin to impart functionality to the surface.

A fourth object of the present invention is to provide a useful weather strip material for forming a surface treatment layer, which is excellent in lubricity, abrasion resistance, heat resistance and weatherability although the material also contributes to environmental conservation properties, at a slide contact portion of a high-molecular elastomer material forming a weather strip, said slide contact portion being to be brought into sliding contact with another part, by using the newly-developed, self-crosslinking polyhydroxy polyurethane resin.

Means for Solving the Problem

The above-described objects can be achieved by the present invention to be described hereinafter. Specifically, the present invention provides a self-crosslinking polyhydroxy polyurethane resin characterized by having been derived from a reaction of a 5-membered cyclic carbonate compound and an amine compound and having masked isocyanate groups in a structure thereof.

As more preferred embodiments of the resin, the following resins can be mentioned: the above-described self-crosslinking polyhydroxy polyurethane resin wherein the 5-membered cyclic carbonate compound is a reaction product of an epoxy compound and carbon dioxide, and contains, in a structure thereof, carbon dioxide in a range of from 1 to 25 mass %; and the above-described self-crosslinking polyhydroxy polyurethane resin wherein the masked isocyanate groups are reaction products of organic polyisocyanate groups and a masking agent, and, when subjected to heat treatment, are demasked to form isocyanate groups, which are reactable with hydroxyl groups in the structure of the self-crosslinking polyhydroxy polyurethane resin such that the resin is allowed to undergo self-crosslinking.

The present invention also provides, as another embodiment, a process for producing the self-crosslinking polyhydroxy polyurethane resin, characterized by using a modifier having at least one free isocyanate group and at least one masked isocyanate group, and reacting free isocyanate groups of the modifier with hydroxyl groups in the polyhydroxy polyurethane resin, which has been derived from the reaction of the 5-membered cyclic carbonate compound and the amine compound, to obtain the polyhydroxy polyurethane resin having the masked isocyanate groups in the structure thereof.

As more preferred embodiments of the production process, the following processes can be mentioned: the process for producing the self-crosslinking polyhydroxy polyurethane resin, wherein the 5-membered cyclic carbonate compound is a reaction product of an epoxy compound and carbon dioxide, and carbon dioxide is contained in a range of from 1 to 25 mass % in the polyhydroxy polyurethane resin derived from the reaction of the epoxy compound and the amine compound; and the process for producing the self-crosslinking polyhydroxy polyurethane resin, wherein the modifier is a reaction product of an organic polyisocyanate compound and a masking agent.

The present invention also provides, as a further embodiment, a resin material characterized by comprising the self-crosslinking polyhydroxy polyurethane resin and another binder resin blended therewith.

The present invention also provides, as a still further embodiment, an imitation leather characterized by comprising a base fabric and a resin composition composed, as a principal component, of a self-crosslinking polyhydroxy polyurethane resin, which has been derived from a reaction of a 5-membered cyclic carbonate compound and an amine compound and has masked isocyanate groups in a structure thereof, and impregnated in or laminated on the base fabric.

As more preferred embodiments of the imitation leather, the following imitation leathers can be mentioned: the above-described imitation leather wherein the 5-membered cyclic carbonate compound is a reaction product of an epoxy compound and carbon dioxide, and contains, in the structure of the self-crosslinking polyhydroxy polyurethane resin, carbon dioxide in a range of from 1 to 25 mass %; the above-described imitation leather wherein the masked isocyanate groups are reaction products of organic polyisocyanate groups and a masking agent, and, when subjected to heat treatment, are demasked to form isocyanate groups, which are reactable with hydroxyl groups in the structure of the self-crosslinking polyhydroxy polyurethane resin such that the resin is allowed to undergo self-crosslinking; and the above-described imitation leather wherein the resin composition further comprises another resin.

The present invention also provides, as a still further embodiment, a skin material made of a thermoplastic polyolefin resin, characterized by comprising a thermoplastic polyolefin resin sheet and a top coat layer formed directly or via a primer layer on the sheet, wherein the top coat layer has been formed with a resin composition composed, as a principal component, of a self-crosslinking polyhydroxy polyurethane resin containing masked isocyanate groups in a molecule thereof.

As more preferred embodiments of the skin material, the following skin materials can be mentioned: the skin material wherein the masked isocyanate groups are reaction products of organic polyisocyanate groups and a masking agent, and, when subjected to heat treatment, are demasked to form isocyanate groups, which are reactable with hydroxyl groups in the structure of the polyhydroxy polyurethane resin such that the resin is allowed to undergo self-crosslinking; the skin material wherein the self-crosslinking polyhydroxy polyurethane resin has been obtained by modifying, with a modifier, a polyhydroxy polyurethane resin derived from a reaction of a 5-membered cyclic carbonate compound and an amine compound; the skin material wherein the 5-membered cyclic carbonate compound has been obtained by reacting an epoxy compound and carbon dioxide; the skin material wherein the self-crosslinking polyhydroxy polyurethane resin contains carbon dioxide in a raw material thereof and contains carbon dioxide in a range of from 1 to 25 mass % in the resin; the skin material wherein the resin composition with which the top coat layer is formed comprises the self-crosslinking polyhydroxy polyurethane resin, and a material, which is composed of one fine powder or a combination of two or more fine powders selected from organic fine powders and inorganic fine powders, added as a matting agent in a proportion of from 1 to 150 parts by mass per 100 parts by mass of the self-crosslinking polyhydroxy polyurethane resin; and the skin material wherein the resin composition which forms the top coat layer further comprises a binder resin other than the self-crosslinking polyhydroxy polyurethane resin.

The present invention also provides, as an even further embodiment, a weather strip material for coating and/or impregnating a high-molecular elastomer material to form a surface treatment layer at a slide contact portion to be brought into sliding contact with another part, characterized in that the weather strip material is a resin composition comprising a self-crosslinking polyhydroxy polyurethane resin containing masked isocyanate groups in a molecule thereof, and a diorganopolysiloxane having an average polymerization degree of from 5,000 to 10,000 and/or a silicone oil having a kinematic viscosity of from 100 to 10,000 CS.

As more preferred embodiments of the weather strip material, the following weather strip materials can be mentioned: the weather strip material wherein the masked isocyanate groups are reaction products of organic polyisocyanate groups and a masking agent, and, when subjected to heat treatment, are demasked to form isocyanate groups, which are reactable with hydroxyl groups in the structure of the polyhydroxy polyurethane resin such that the resin is allowed to undergo self-crosslinking; the weather strip material wherein the self-crosslinking polyhydroxy polyurethane resin has been obtained by modifying, with a modifier, a polyhydroxy polyurethane resin derived from a reaction of a 5-membered cyclic carbonate compound and an amine compound; the weather strip material wherein the 5-membered cyclic carbonate compound has been obtained by reacting an epoxy compound and carbon dioxide; the weather strip material wherein the self-crosslinking polyhydroxy polyurethane resin contains carbon dioxide in a raw material thereof and contains carbon dioxide in a range of from 1 to 25 mass % in the resin; the weather strip material, which is a resin composition comprising the self-crosslinking polyhydroxy polyurethane resin, and a diorganopolysiloxane having an average polymerization degree of from 5,000 to 10,000 and/or a silicone oil having a kinematic viscosity of from 100 to 10,000 CS in a proportion of from 1 to 100 parts by mass per 100 parts by mass of the self-crosslinking polyhydroxy polyurethane resin; the weather strip material, which is a resin composition comprising the self-crosslinking polyhydroxy polyurethane resin, and an additive, which is composed of one fine powder or a combination of two or more fine powders selected from organic fine powders and inorganic fine powders, added in a proportion of from 1 to 150 parts by mass per 100 parts by mass of the self-crosslinking polyhydroxy polyurethane resin; and the resin composition further comprising a binder resin other than the self-crosslinking polyhydroxy polyurethane resin.

Advantageous Effects of the Invention

According to the present invention, there is provided a self-crosslinking polyhydroxy polyurethane resin that has provided, as a material effectively usable for industrial applications, a polyhydroxy polyurethane resin, the development of applications of which has not moved ahead although it is considered to contribute to the resolution of problems such as global warming and resource depletion. More specifically, there is provided a self-crosslinking polyhydroxy polyurethane resin that products formed with the resin can be also sufficiently satisfactory in performance such as heat resistance, chemical resistance and abrasion resistance although they are environment-responsive products which contain carbon dioxide incorporated therein and can contribute to the reduction of warming gas.

According to the present invention, there is also provided an imitation leather, which owing to the use of the above-provided resin, is not inferior to conventional imitation leather products, is excellent in surface scratch resistance, abrasion resistance, chemical resistance and heat resistance, and which owing to the use, as a material for forming the imitation leather, of a material that carbon dioxide is incorporated and fixed in the material, is an environment-responsive product that can contribute to the reduction of carbon dioxide considered to be a worldwide problem as a global greenhouse gas and is also excellent from the viewpoint of the conservation of the global environment.

According to the present invention, there is also provided a skin material made of a thermoplastic polyolefin material, which, owing to the use of the above-provided resin for the formation of a top coat layer that makes up the skin material made of a thermoplastic polyolefin resin, is excellent in surface scratch resistance, abrasion resistance, chemical resistance and heat resistance, and more preferably, is also excellent in uniform matting effect, and which owing to the usability of the material with carbon dioxide incorporated therein, is an environment-responsive product that can also contribute to the reduction of global greenhouse gas.

According to the present invention, there is provided a useful material which, owing to the use of the above-provided resin in a material for forming a surface treatment layer at a slide contact portion of a high-molecular elastomer material as a base material in a weather strip for a car or building, said slide contact portion being to be brought into sliding contact with another part, provides the resulting surface treatment layer with lubricity, abrasion resistance, heat resistance and weatherability and also contributes to environmental conservation properties. More specifically, as the material is a composition containing the above-provided self-crosslinking polyhydroxy polyurethane resin and a diorganopolysiloxane having an average polymerization degree of from 5,000 to 10,000 and/or a silicone oil having a kinematic viscosity of from 100 to 10,000 CS, the resulting surface treatment layer is obviously excellent in basic characteristics, and moreover, owing to the usability of carbon dioxide as its raw material, the material is also useful from the viewpoint of the conservation of the global environment and the use of the material provides environment-responsive products.

MODES FOR CARRYING OUT THE INVENTION

The present invention will next be described in further detail based on preferred embodiments. The self-crosslinking polyhydroxy polyurethane resin according to the present invention is characterized by having been derived from a reaction of a 5-membered cyclic carbonate compound and an amine compound and having masked isocyanate groups in a structure thereof. The self-crosslinking polyhydroxy polyurethane resin can be obtained by using a modifier having at least one free isocyanate group and at least one masked isocyanate group, and reacting free isocyanate groups of the modifier with hydroxyl groups in the polyhydroxy polyurethane resin derived from the reaction of the 5-membered cyclic carbonate compound and the amine compound. As the 5-membered cyclic carbonate compound can be obtained by reacting an epoxy compound and carbon dioxide, the self-crosslinking polyhydroxy polyurethane resin is a material that also contributes to environmental conservation properties. A description will hereinafter be made about the respective components.
[Self-Crosslinking Polyhydroxy Polyurethane Resin] (Modifier)
<Organic Polyisocyanate Compound>
A description will be made about the components for the modifier that is used upon production of the self-crosslinking polyhydroxy polyurethane resin according to the present invention. As the modifier, a reaction product of an organic polyisocyanate compound and a masking agent is used. The organic polyisocyanate compound used in this reaction is an organic compound, which is an aliphatic or aromatic compound and has at least two isocyanate groups therein, and has been widely used as a synthesis raw material for polyurethane resins over years. Such known organic polyisocyanate compounds are all useful in the present invention. As particularly preferred organic polyisocyanate compounds, the followings can be mentioned.

Examples include 1,4-tetramethylene diisocyanate, 1,5-pentamethylene diisocyanate, 1,6-hexamethylene diisocyanate, 3-isocyanatomethyl-3,5,5-trimethylcyclohexyl isocyanate (isophorone diisocyanate), 4,4'-dicyclohexylmethane diisocyanate, tolylene diisocyanate, 4,4'-diphenylmethane diisocyanate, 1,5-nephthalene diisocyanate, tolidine diisocyanate, xylylene diisocyanate, and the like. Adducts of these organic polyisocyanate compounds and other compounds, for example, those of the following structural formulas can also be used suitably. The present invention shall, however, not be limited to their use.

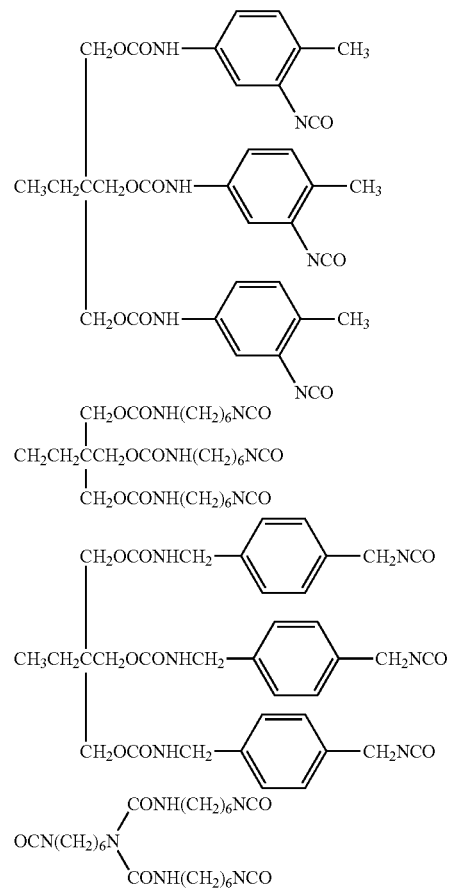

<Masking Agent>
The masking agent for use in the present invention is the above-described reaction product of the organic polyisocyanate and masking agent. As the masking agent, those to be described below can be used. They are alcohol-based, phenol-based, active methylene-based, acid amide-based, imidazole-based, urea-based, oxime-based and pyridine-based compounds, and the like. They can be used either singly or in combination. Specific examples of the masking agent include those to be described below.

As alcohol-based masking agents, methanol, ethanol, propanol, butanol, 2-ethylhexanol, methylcellosolve, cyclohexanol and the like can be mentioned. As phenol-based masking agents, phenol, cresol, ethylphenol, nonylphenyl and the like can be mentioned. As active methylene-based masking agents, dimethyl malonate, diethyl malonate, methyl acetoacetate, ethyl acetoacetate, acetylacetone and the like can be mentioned. As acid amide-based masking agents, acetoanilide, acetic acidamide, ε-caprolactam, γ-butyrolactam and the like can be mentioned. As imidazole-based masking agents, imidazole, 2-methylimidazole and the like can be mentioned. As urea-based masking agents, urea, thiourea, ethylene urea and the like can be mentioned. As oxime-based masking agents, formamidoxime, acetoxime, methyl ethyl ketoxime, cyclohexanone oxime and the like can be mentioned. As pyridine-based masking agents, 2-hydroxypyridine, 2-hydroxyquinoline and the like can be mentioned.

<Synthesis Process of Modifier>

One of the above-enumerated organic polyisocyanate compounds and one of the above-enumerated masking agents are reacted to synthesize a modifier, which is useful in the present invention, contains at least one free isocyanate group and at least one masked isocyanate group. No particular limitation is imposed on its synthesis process, but a modifier can be readily obtained by reacting the masking agent and the organic polyisocyanate compound at such a functional group ratio that one or more isocyanate groups become excessive per molecule, in the presence or absence of an organic solvent and catalyst, at a temperature of from 0 to 150° C., preferably from 20 to 80° C., for from 30 minutes to 3 hours.

(Polyhydroxy Polyurethane Resin)

The self-crosslinking polyhydroxy polyurethane resin according to the present invention can be obtained by modifying a polyhydroxy polyurethane resin with such a specific modifier as described above. The polyhydroxy polyurethane resin for use in the modification can be obtained by a reaction of a 5-membered cyclic carbonate compound and an amine compound. A description will hereinafter be made about the respective components used in the reaction.

<5-Membered Cyclic Carbonate Compound>

The 5-membered cyclic carbonate compound useful in the present invention can be produced by reacting an epoxy compound and carbon dioxide as shown by the below-described "Equation-A". Described more specifically, it can be obtained by reacting the epoxy compound with carbon dioxide in the presence or absence of an organic solvent, in the presence of a catalyst, at a temperature of from 40° C. to 150° C., under normal pressure or slightly elevated pressure, for from 10 to 20 hours.

Equation-A

Examples of the epoxy compound, which is usable in the present invention, include such compounds as will be described next.

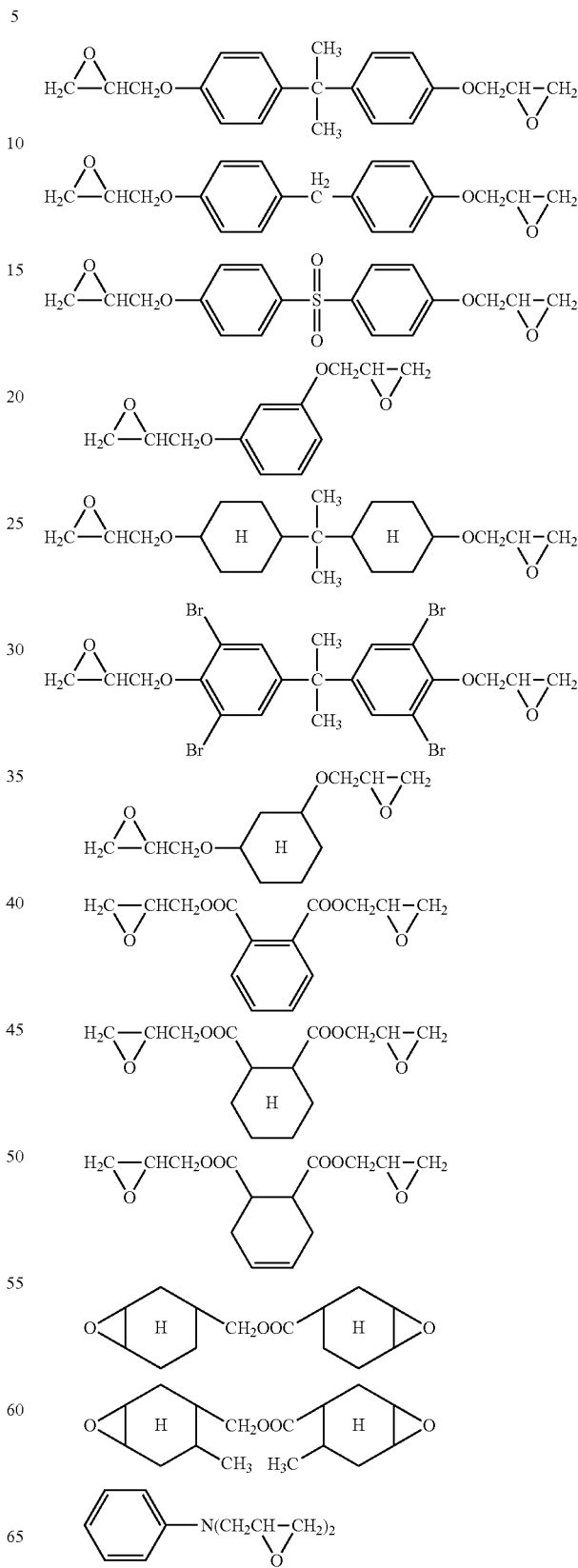

-continued

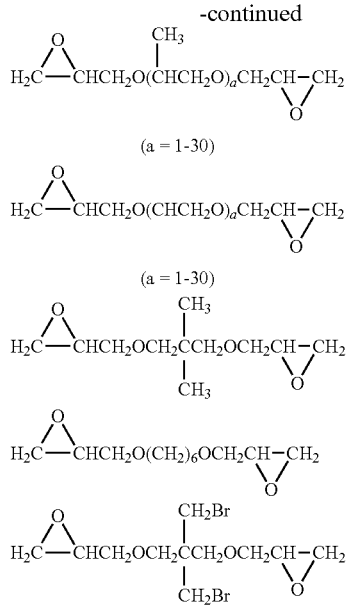

The above-enumerated epoxy compounds are preferred compounds which can be used in the present invention, and the pre sent invention shall not be limited to these exemplified compounds. Not only the above-exemplified compounds but also other similar epoxy compounds are available on the market these days. Accordingly, those readily available on the market can all be used in the present invention.

<Catalyst and Reaction>

As catalysts usable in the reaction of such an epoxy compound as described above and carbon dioxide, base catalysts and Lewis acid catalysts can be mentioned.

The base catalysts include tertiary amines such as triethylamine and tributylamine; cyclic amines such as diazabicycloundecene, diazabicyclooctane and pyridine; alkali metal salts such as lithium chloride, lithium bromide, lithium fluoride and sodium chloride; alkaline earth metal salts such as calcium chloride; quaternary ammonium salts such as tetrabutyl ammonium chloride, tetraethyl ammonium bromide and benzyl trimethyl ammonium chloride; carbonate salts such as potassium carbonate and sodium carbonate; metal acetate salts such as zinc acetate, lead acetate, copper acetate and iron acetate; metal oxides such as calcium oxide, magnesium oxide and zinc oxide; and phosphonium salts such as tetrabutyl phosphonium chloride.

The Lewis acid catalysts include tin compounds such as tetrabutyltin, dibutyltin dilaurate, dibutyltin diacetate and dibutyltin octoate.

The above-described catalyst may be used in a proportion of from 0.1 to 100 parts by mass or so, preferably from 0.3 to 20 parts by mass per 50 parts by mass of the epoxy compound. If the above-described catalyst is used in a proportion of smaller than 0.1 parts by mass, the catalyst will be unable to fully exhibit its effects as a catalyst. If the above-described catalyst is used in a proportion of greater than 100 parts by mass, on the other hand, the resin to be obtained finally may be lowered in various performance. Therefore, such an excessively small or large proportion is not preferred. In such a case that the residual catalyst would induce a serious reduction in performance, however, it may be configured to wash the reaction mixture with purified water such that the residual catalyst can be removed.

Organic solvents usable in the reaction of the epoxy compound and carbon dioxide include dimethylformamide, dimethyl sulfoxide, dimethylacetamide, N-methylpyrrolidone, N-ethylpyrrolidone, tetrahydrofuran, and the like. These organic solvents may also be used as mixed systems with other poor solvents, for example, methyl ethyl ketone, xylene, toluene, tetrahydrofuran, diethylether, cyclohexanone, and the like.

The polyhydroxy polyurethane resin for use in the present invention can be obtained by reacting the 5-membered cyclic carbonate compound, which has been obtained as described above, with an amine compound in the presence of an organic solvent at a temperature of from 20° C. to 150° C. as shown by the below-described "Equation-B".

Equation-B

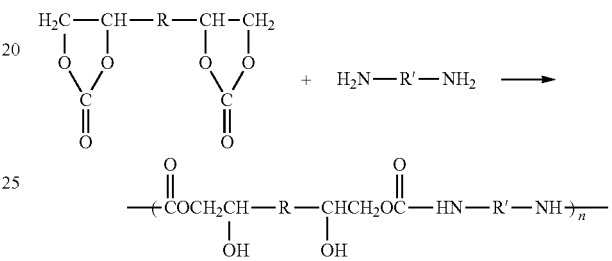

<Amine Compound>

As the amine compound for use in the above-described reaction, a diamine is preferred. No particular limitation is imposed on the diamine, and diamines which have been conventionally used in the production of polyurethane resins are all usable. Illustrative are aliphatic diamines such as methylenediamine, ethylenediamine, trimethylenediamine, 1,3-diaminopropane, hexamethylenediamine and octamethylenediamine; aromatic diamines such as phenylenediamine, 3,3'-dichloro-4,4'-diaminodiphenylmethane, 4,4'-methylenebis(phenylamine), 4,4'-diaminodiphenyl ether, 4,4'-diaminodiphenylsulfone, meta-xylylenediamine and para-xylylenediamine; alicyclic diamines such as 1,4-cyclohexanediamine, 4,4'-diaminocyclohexylmethane, 1,4'-diaminomethylcyclohexane and isophorone diamine; and alkanoldiamines such as monoethanoldiamine, aminoethylethanolamine and hydroxyethyl aminopropyl amine.

The above-enumerated amine compounds are those preferred for use in the present invention, and the present invention shall not be limited to these exemplified compounds. Amine compounds usable in the present invention are, therefore, not limited to the above-exemplified compounds alone. Other amine compounds are also available on the market these days. These amine compounds readily available from the market can all be used in the present invention.

<Physical Properties of Polyhydroxy Polyurethane Resin>

Further, the polyhydroxy polyurethane resin for use in the present invention may preferably have a number average molecular weight (a polystyrene-equivalent value as measured by GPC) of from 2,000 to 100,000 or so. More preferably, one having a number average molecular weight of from 5,000 to 70,000 or so may be used.

The hydroxyl value of the polyhydroxy polyurethane resin for use in the present invention may preferably be from 20 to 300 mgKOH/g. If the content of hydroxyl groups is smaller than the above-described range, the carbon dioxide reduction effect is insufficient. If the content of hydroxyl groups exceeds the above-described range, various physical properties as a high molecular compound become insufficient. Contents of hydroxyl groups outside the above-described range are not preferred accordingly.

(Synthesis of Self-Crosslinking Polyhydroxy Polyurethane Resin)

The self-crosslinking polyhydroxy polyurethane resin according to the present invention can be obtained by reacting a modifier and a polyhydroxy polyurethane resin, both of which can be obtained as mentioned above. Specifically, it can be synthesized through a reaction between hydroxyl groups in the polyhydroxy polyurethane resin and at least one free isocyanate group in the modifier.

The modification rate of the self-crosslinking polyhydroxy polyurethane resin according to the present invention with the modifier may preferably be from 2 to 60%. A modification rate of lower than 2% is not preferred, because it induces no sufficient crosslinking so that the resulting product may be insufficient in heat resistance, chemical resistance and the like. A modification rate of higher than 60%, on the other hand, is not preferred either, because the possibility that demasked isocyanate groups would remain without any reaction may increase. It is to be noted that the above-described modification rate is calculated as follows.

Modification rate (%)={1-(hydroxyl groups in a resin after modification÷hydroxyl groups in the resin before modification)}×100

The reaction of the modifier and polyhydroxy polyurethane resin can be readily carried out by reacting them in the presence or absence of an organic solvent and catalyst, at a temperature of from 0 to 150° C., preferably from 20 to 80° C. for from 30 minutes to 3 hours. However, it is necessary to pay attention to carrying out the reaction at a temperature of lower than the removal temperature of the masking agent during the reaction such that the synthesized polyhydroxy polyurethane resin has masked isocyanate groups in its structure.

[Use of Self-Crosslinking Polyhydroxy Polyurethane Resin]

The self-crosslinking polyhydroxy polyurethane resin of the present invention, which can be obtained as described above, can be used, as it is, as film and molding materials, various coating materials, diverse paints, miscellaneous binders and the like, so that products excellent in abrasion resistance, chemical resistance and heat resistance can be obtained. For various applications and upon formation of films, the self-crosslinking polyhydroxy polyurethane resin can be used as resin materials by blending desired ones of conventionally-known diverse resins as binder resins or the like in the self-crosslinking polyhydroxy polyurethane resin. Preferred as binder resins usable as described above are those which can chemically react with isocyanate groups formed as a result of the removal of masked moieties in the structure of the self-crosslinking polyhydroxy polyurethane resin. However, even resins which do not have such reactivity as described above can still be formed into resin materials by using them as needed according to purposes in combination with the self-crosslinking polyhydroxy polyurethane resin according to the present invention.

As binder resins usable in combination with the self-crosslinking polyhydroxy polyurethane resin according to the present invention, various resins which have been conventionally employed as binder resins can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. It is also possible to use resins obtained by modifying these various resins with silicone or fluorine. When such a binder resin is used in combination, it may be added in a proportion of preferably from 5 to 90 parts by mass, more preferably not greater than 60 parts by mass per 100 parts by mass of the self-crosslinking polyhydroxy polyurethane resin according to the present invention although the proportion differs depending on the product to be formed or its application purpose. Needless to say, as the self-crosslinking polyhydroxy polyurethane resin according to the present invention is used in a greater proportion, the resulting environment-responsive product becomes more preferred.

When subjected to heat treatment, the self-crosslinking polyhydroxy polyurethane resin according to the present invention is demasked to form isocyanate groups. The thus-formed isocyanate groups react with hydroxyl groups in the polyhydroxy polyurethane resin, thereby undergoing self-crosslinking to form a crosslinked resin. When formed into products or the like, excellent heat resistance, chemical resistance and abrasion resistance can be obtained. On the other hand, the polyhydroxy polyurethane resin to be used upon synthesis of the self-crosslinking polyhydroxy polyurethane resin according to the present invention is synthesized using a 5-membered cyclic carbonate compound. As this 5-membered cyclic carbonate compound can be obtained by reacting an epoxy compound and carbon dioxide as described above, carbon dioxide can be incorporated and fixed in the resin. This means that the present invention makes it possible to provide a material responsive to environmental conservation, which is useful from the viewpoint of the reduction of warming gas and has not been realized with conventional products.

The self-crosslinking polyhydroxy polyurethane resin according to the present invention is very useful as various molding materials, materials for synthetic leathers and artificial leathers, fiber coating materials, surface treatment materials, thermal recording media, strippable materials, paints, binders for printing inks, and the like. A description will hereinafter be made about each of its application examples, that is, an imitation leather (synthetic leather or artificial leather material), a skin material made of a thermoplastic olefin resin, and a weather strip material.

<Imitation Leather>
(Resin Composition for Imitation Leather)

The imitation leather according to the present invention is characterized in that a resin composition (hereinafter called "the resin composition for imitation leather"), which contains as a principal component the self-crosslinking polyhydroxy polyurethane resin of the present invention derived from the reaction of the 5-membered cyclic carbonate compound and the amine compound and having masked isocyanate groups in its structure, is filled in or laminated on a base fabric. The masked isocyanate groups in the resin are reaction products of organic polyisocyanate groups and a masking agent and, when subjected to heat treatment, are demasked to form isocyanate groups, which are reactable with hydroxyl groups in the structure of the self-crosslinking polyhydroxy polyurethane resin such that the resin is allowed to undergo self-crosslinking. Therefore, the use of the resin makes it possible to obtain an imitation leather excellent in surface scratch resistance, abrasion resistance, chemical resistance and heat resistance. Concerning the self-crosslinking polyhydroxy polyurethane resin which is useful in the present invention and is preferred particularly from the viewpoint of the conservation of the global environment, the 5-membered cyclic carbonate compound is the reaction product of the epoxy compound and carbon dioxide, and contains carbon dioxide in a range of from 1 to 25 mass % in its structure. The resin composition for imitation leather may further contain another resin.

When using the self-crosslinking polyhydroxy polyurethane resin according to the present invention for an imitation leather, the modification rate of the resin with a modifier may preferably range from 2 to 60%. Its performance such as the abrasion resistance, chemical resistance and heat resistance after heat treatment can be controlled to some extent by the percentage of the modification rate. However, a modification rate of lower than 2% is not preferred, because no sufficient crosslinking occurs and, when employed for the production of an imitation leather, the imitation leather may be insufficient in heat resistance, chemical resistance and the like. A modification rate of higher than 60%, on the other hand, is not preferred either, because the resulting imitation leather may be impaired in hand feeling due to excessive crosslinking and demasked isocyanate groups may remain without any reaction.

The resin composition for imitation leather is used in the form of an organic solvent solution or a water dispersion upon production of an imitation leather. When the resin composition for imitation leather is used in the form of an organic solvent solution, it is preferred to use an organic solvent to be described below. Examples include dimethylformamide, dimethylsulfoxide, dimethyl acetamide, N-methylpyrrolidone, N-ethylpyrrolidone, and the like. The concentration of the resin in the organic solvent solution 100 mass % may preferably be from 10 to 60 mass %. A resin concentration of lower than 10 mass % is not preferred, because it may lead to inferior film-forming properties in wet-process film formation, the resulting film may be insufficient in thickness, and hence, the resulting imitation leather may be provided with insufficient strength. A resin concentration of higher than 60 mass %, on the other hand, may lead to incomplete formation of a porous layer in wet-process film formation, and moreover, may raise such a problem that the organic solvent would remain in the resulting film. Such an excessively high resin concentration is, therefore, not preferred either from the viewpoint of measures against VOC.

When the resin composition for imitation leather is used in the form of a water dispersion, it is preferred to use the resin composition for imitation leather as will be described hereinafter. Described specifically, the hydroxyl groups or NH groups in the self-crosslinking polyhydroxy polyurethane resin are half-esterified or half-amidated with an acid anhydride to introduce carboxyl groups into the resin. Subsequently, the carboxyl groups are preferably neutralized with ammonia, an organic amine compound, an inorganic base or the like to form carboxylate salt groups such that the resin can be used as a self-emulsified water dispersion. As the acid anhydride used here, illustrative are phthalic anhydride, trimellitic anhydride, hexahydrophthalic anhydride, and the like. On the other hand, examples of the organic amine compound include monoethanolamine, diethanolamine, triethanolamine, diethylethanolamine, aminoethylethanolamine, and the like. Further, the resin composition for imitation leather may be a water dispersion emulsified with a surfactant in water by a method known per se in the art.

The resin composition for imitation leather may also be used by blending, in addition to the above-described resin, one or more of conventionally-known various other resins to adjust the workability such as impregnation, coating or covering applicability and the hand feeling and various performance of the imitation leather to be obtained. Preferred as other resins to be used or blended are those chemically reactable with isocyanate groups to be formed as a result of demasking of the masked isocyanate groups in the self-crosslinking polyhydroxy polyurethane resin when subjected to heating or the like. However, such other resins are not limited to the above-mentioned resins, and even resins having no reactivity can be also used in the present invention.

As resins usable when the resin composition for imitation leather, which is useful in the present invention, is in the form of a combination of the self-crosslinking polyhydroxy polyurethane resin with one or more of the other resins, polyurethane-based resins which have been conventionally used as materials for forming imitation leathers are preferred although no particular limitation is imposed. Other usable examples include acrylic resins, polyester resins, polybutadiene resins, silicone resins, melamine resins, phenol resins, phenoxy resins, vinyl chloride resin, vinyl chloride-vinyl acetate resin, cellulose resins, alkyd resins, modified cellulose resins, fluorinated resins, polyvinyl butyral resins, epoxy resins, polyamide resins, and the like. When one or more of these resins are used in combination, such a resin or resins may be used in a range of from 5 to 90 parts by mass per 100 parts by mass of the polyhydroxy polyurethane resin according to the present invention. Needless to say, as the self-crosslinking polyhydroxy polyurethane resin according to the present invention is used in a greater proportion, the resulting environment-responsive product becomes more preferred.

To the resin composition for imitation leather, one or more of various additives such as antioxidants, ultraviolet absorbers, anti-hydrolysis agents, pigments, dyes, flame retardants and fillers may be added in addition to one or more of the above-described various resins.

(Production Process of Imitation Leather)

The imitation leather according to the present invention is characterized in that the resin composition for imitation leather, which contains as a principal component the above-described crosslinking polyhydroxy polyurethane resin according to the present invention, is filled in or laminated on the base fabric. No particular limitation is imposed on the production process of the imitation leather according to the present invention insofar as it does not depart from the scope of the present invention, and a known production process of an artificial leather or synthetic leather can be used. In the imitation leather according to the present invention, there is also included one produced by arranging a plasticizer-containing, vinyl chloride resin layer on a base fabric, providing it as a base material sheet, and forming on the base material sheet a layer composed of a resin composition for imitation leather, said resin composition containing as a principal component thereof the self-crosslinking polyhydroxy polyurethane resin which characterizes the present invention.

As the base fabric (base material sheet) that makes up the imitation leather according to the present invention, base fabrics (base material sheets) which have been conventionally used in the production of imitation leathers are all usable, and no particular limitation is imposed.

In the self-crosslinking polyhydroxy polyurethane resin useful in the formation of the imitation leather according to the present invention, the masked isocyanate groups are demasked to form isocyanate groups when subjected to heat treatment. The thus-formed isocyanate groups and the hydroxyl groups in the polyhydroxy polyurethane resin then react so that self-crosslinking takes place to form a crosslinked resin. The resulting resin layer, therefore, strongly interact with the base fabric (base material sheet) at an interface between them. It is, therefore, possible to obtain excellent performance that the resin shows superb adhesiveness and flexibility to the base material sheet and outstanding antistatic effect is imparted to the resin layer so formed, thereby making it possible to provide the imitation leather with improved performance. The thus-formed imitation leather is provided with excellent scratch resistance, abrasion resistance, chemical resistance and heat resistance. Further, the self-crosslinking polyhydroxy polyurethane resin according to the present invention to be used in the production of the above-described imitation leather uses the polyhydroxy polyurethane resin synthesized using a 5-membered cyclic carbonate compound. As mentioned above, the 5-membered cyclic carbonate compound can be obtained by reacting an epoxy compound and carbon dioxide so that carbon dioxide can be incorporated and fixed in the resin. This means that the present invention makes it possible to provide an imitation leather as a product responsive to environmental conservation, which is useful from the viewpoint of the reduction of warming gas and has not been realized with conventional products.

[Skin Material Made of Thermoplastic Polyolefin Resin]
(Resin Composition for Skin Material)

The skin material according to the present invention, which is made of the thermoplastic polyolefin resin, is characterized in that the skin material has the thermoplastic polyolefin resin sheet and the top coat layer formed directly or via a primer on the sheet and the top coat layer has been formed with a resin composition (hereinafter called "the resin composition for skin material") composed as a principal component of the above-mentioned self-crosslinking polyhydroxy polyurethane resin containing masked isocyanate groups in its molecule. More specifically, the skin material is constructed by directly coating the resin composition for skin material, said resin composition having the above-described specific feature, on the thermoplastic polyolefin resin sheet to form the top coat layer or by forming a primer layer on the resin sheet and then coating the resin composition for skin material, said resin composition having the above-described specific feature, on the primer layer. The skin material is characterized in that the top coat layer is formed with the resin composition for skin material, said resin composition being composed as a principal component of the self-crosslinking polyhydroxy polyurethane resin containing masked isocyanate groups in its molecule. Further, the resin composition for skin material may be one obtained by adding, as a matting agent, a material composed of one fine powder or a combination of two or more fine powders selected from organic fine powders and inorganic fine powders.

When using the self-crosslinking polyhydroxy polyurethane resin according to the present invention for a skin material, the modification rate of the resin with a modifier may preferably range from 2 to 60%, more preferably from 5 to 40%. Its performance such as the abrasion resistance, chemical resistance and heat resistance after heat treatment can be controlled to some extent by the percentage of the modification rate. However, a modification rate of lower than 2% is not preferred, because the heat resistance, chemical resistance and the like, which are required as a skin material and can be obtained by sufficient crosslinking, may not be obtained sufficiently. A modification rate of higher than 60%, on the other hand, is not preferred either, because the suitable whitening resistance on bending of the skin material according to the present invention may be impaired by excessive crosslinking and the possibility that demasked isocyanate groups would remain in the resin without any reaction may increase.

The skin material according to the present invention, which is made of the thermoplastic polyolefin resin, can be obtained by coating the resin composition for skin material, said resin composition containing as a principal component thereof the self-crosslinking polyhydroxy polyurethane resin according to the present invention, as a top coat layer directly or via a primer layer on a thermoplastic polyolefin resin sheet to be mentioned subsequently herein. A description will hereinafter be made about other components employed in the resin composition for skin material.

<Matting Agent>

In the present invention, it is also preferred to form a top coat layer with a resin composition for skin material, said resin composition being composed of the self-crosslinking polyhydroxy polyurethane resin according to the present invention and a matting agent which may be added as needed. As the matting agent, organic fine powders and inorganic fine powders can be used either singly or in a combination of two or more. No particular limitation is imposed on the organic fine powder or powders to be used as described above. Usable examples include acrylic resin particles, styrene resin particles, styrene-acrylic resin particles, phenol resin particles, melamine resin particles, acrylic-polyurethane resin particles, polyurethane resin particles, polyester resin particles, nylon resin particles, silicone resin particles, polyethylene resin particles, and the like. These powders may preferably have an average particle size in a range of from 0.1 to 10 μm. As their shapes, a spherical shape or a substantially spherical shape is preferred because the resulting coating film can be provided with particularly good matte properties.

On the other hand, the inorganic fine powders include, for example, talc, mica, calcium carbonate, barium sulfate, magnesium carbonate, clay, alumina, silica, carbon fibers, glass fibers, metal fibers, carbon black, titanium oxide, molybdenum, magnesium hydroxide, bentonite, graphite, and the like. As the average particle sizes of these powders, 10 μm or smaller can conform to the objects of the present invention, but the smaller as much as possible, the more preferred.

Such a matting agent as described above may be added in a proportion ranging from 1 to 150 parts by mass, preferably from 3 to 60 parts by mass per 100 parts by mass of the self-crosslinking polyhydroxy polyurethane resin. A proportion of smaller than 1 parts by mass cannot obtain sufficient effect by the addition, while a proportion of greater than 150 parts by mass may provide the resulting coating film with significantly lowered mechanical/physical properties. Proportions outside the above-described range are not preferred accordingly.

<Water or Organic Solvent>

The resin composition for skin material, which is useful in the present invention, is basically an organic solvent solution or water dispersion (solution) with the self-crosslinking polyhydroxy polyurethane resin of the present invention contained therein. As an organic solvent useful upon preparation of the organic solvent solution, illustrative are dimethylformamide, dimethyl sulfoxide, dimethyl acetamide, N-methylpyrrolidone, N-ethylpyrrolidone, and the like. The concentration of the resin in the organic solvent may preferably be from 3 to 60 mass %. A resin concentration of lower than 3 mass % is not preferred, because it may lead to inferior film-forming properties, and the resulting film may be insufficient in thickness and may hence be provided with insufficient strength. A resin concentration of higher than 60 mass %, on the other hand, is not preferred either, because such an excessively high resin concentration may lead to incomplete formation of a film after drying, and moreover, may raise such a problem that the organic solvent would remain in the resulting film.

When the resin composition for skin material, which is useful in the present invention, is formed into a water dispersion (solution), it is preferred to prepare the water dispersion (solution) as will be described hereinafter. First, the hydroxyl groups or NH groups in the self-crosslinking polyhydroxy polyurethane resin according to the present invention are half-esterified or half-amidated with an acid anhydride to introduce carboxyl groups into the resin. Subsequently, the carboxyl groups are preferably neutralized with ammonia, an organic amine compound, an inorganic base or the like to form carboxylate salt groups such that the resin can be used as a self-emulsified water dispersion.

As the acid anhydride to be used in the foregoing, illustrative are phthalic anhydride, trimellitic anhydride, hexahydrophthalic anhydride, and the like. On the other hand, examples of the organic amine compound include monoethanolamine, diethanolamine, triethanolamine, diethylethanolamine, aminoethylethanolamine, and the like. Further, the self-crosslinking polyhydroxy polyurethane resin according to the present invention to be used in the foregoing may be a water dispersion emulsified with a surfactant in water by a method known per se in the art.

<Other Resins>

In the resin composition for skin material, which is useful in the present invention, one or more of conventionally-known various binder resins can be used or blended to improve the spraying applicability or coating applicability of the top coat layer, which is formed with the resin composition, to the thermoplastic polyolefin resin sheet and the film-forming property of the top coat layer formed with the resin composition. As the binder resins to be used as described above, those which are chemically reactable with the polyisocyanate groups formed as a result of the removal of the masking agent from the self-crosslinking polyhydroxy polyurethane resin are preferred, although even those having no reactivity can be also used in the present invention.

As these binder resins, binder resins which have been conventionally employed for skins of thermoplastic polyolefin resins can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. When such a binder resin or binder resins are used in combination, its or their use proportion can be determined taking the functionality into consideration, and the binder resin or binder resins may be used in a range of from 5 to 90 mass %. Even when a binder resin or binder resins other than the self-crosslinking polyhydroxy polyurethane resin are used as much as 90 mass %, one considered to be a sufficiently environment-responsive product can be still obtained. To provide a product as an environment-responsive product which is also capable of more contributing to environment conservation properties, however, it is preferred to provide the product by using, in a greater proportion, the self-crosslinking polyhydroxy polyurethane resin obtained by using carbon dioxide as a raw material and containing carbon oxide fixed in its structure.

In the resin composition for skin material, which is useful in the present invention, one or more of various additives for coating formulations, such as surface control agents, fluidity control agents, ultraviolet absorbers, dispersants and anti-settling agents, may be further added as needed.

<Thermoplastic Polyolefin Resin Sheet>

The skin material according to the present invention, which is made of the thermoplastic polyolefin resin, is composed of a thermoplastic polyolefin resin sheet and a top coat layer formed on the thermoplastic polyolefin resin sheet by coating the resin composition for skin material directly or via a primer layer. As the thermoplastic polyolefin resin sheet, it is possible to mention a sheet of at least one resin selected from the group consisting of thermoplastic polyolefin resins such as low-density to high-density polyethylenes (LDPE, LLDPE, HDPE, etc.), polypropylenes such as polypropylene and propylene-ethylene copolymer, ethylene-propylene rubber (EPR), ethylene-butene rubber (EBR), and ethylene-propylene-diene terpolymers (EPDM). A polypropylene resin or polyolefin-based thermoplastic elastomer is preferred because it has good pliability and elasticity along with excellent mechanical strength.

The thermoplastic polyolefin resin sheet made from such a material as mentioned above is inert at the surface thereof, and therefore, is inferior in the adhesiveness with a coating to the surface in many instances. It is, therefore, preferred to use the thermoplastic polyolefin resin sheet after physically activating its surface by corona discharge treatment or the like or chemically activating its surface. It is preferred to arrange a top coat layer on the thus-treated sheet by coating the above-described resin composition for skin material directly or after coating a primer layer. As a material for forming the primer layer, a chlorinated polyolefin-based resin, a polyester resin and a polyisocyanate compound, a polyurethane resin and a polyisocyanate compound, or the like can be used.

<Production Process of Skin Material>

Using the resin composition for skin material, said resin composition containing the above-described self-crosslinking polyhydroxy polyurethane resin of the present invention and the matting agent added as needed, the skin material according to the present invention, which is made of the thermoplastic polyolefin resin, can be obtained as will be described hereinafter. First, the above-described resin composition for skin material is applied, by a known coating method such as brush coating, spray coating, roll coating, gravure coating or dip coating, onto a thermoplastic polyolefin resin sheet directly or after a primer layer is formed with the above-described compound or the like on the sheet. In the foregoing, the resin composition is applied to give a dry coat thickness of from 3 to 20 µm or so, and subsequent to drying, heat treatment is conducted at a temperature of from 80 to 170° C. so that a top coat layer having good surface characteristics is formed. Described specifically, the masking agent is removed by the heat treatment from the self-crosslinking polyhydroxy polyurethane resin in the resin composition for skin material, and the resulting isocyanate groups react with the free hydroxyl groups in the polyhydroxy polyurethane resin to form a self-crosslinked film (top coat layer). The skin material according to the present invention, which has been obtained as described above and is made of the thermoplastic polyolefin resin, is formed into desired shapes by vacuum molding to provide it as various products, components or parts.

In the skin material according to the present invention, which is made of the thermoplastic polyolefin resin, its top coat layer is formed as a self-crosslinked film owing to the use of the self-crosslinking polyhydroxy polyurethane resin of the present invention. Its surface characteristics are, therefore, excellent in scratch resistance, abrasion resistance, chemical resistance and heat resistance, and by using the matting agent as needed, the top coat layer is provided as one having performance excellent in uniform matting effect.

The use of the skin material according to the present invention, which is made of the thermoplastic polyolefin resin, is also effective from the viewpoint of the reduction of warming gas. Described specifically, the 5-membered cyclic carbonate compound employed in the synthesis of the polyhydroxy polyurethane resin for use in the present invention can incorporate carbon dioxide in the above-described resin because the 5-membered cyclic carbonate compound can use carbon dioxide as its production raw material. The skin material according to the present invention, which is made of the thermoplastic polyolefin resin, thus makes it possible to provide an environment-responsive product which has been unavailable with any conventional skin material.

[Weather Strip Material]

The weather strip material according to the present invention is a material for coating and/or impregnating a high-molecular elastomer material to form a surface treatment layer at a slide contact portion to be brought into sliding contact with another part, and is characterized in that it contains, as binder resins, the above-described self-crosslinking polyhydroxy polyurethane resin according to the present invention, and a diorganopolysiloxane having an average polymerization degree of from 5,000 to 10,000 and/or a silicone oil having a kinematic viscosity of from 100 to 10,000 CS. The self-crosslinking polyhydroxy polyurethane resin according to the present invention, which is used as described above, has masked isocyanate groups in its structure as mentioned above. The self-crosslinking polyhydroxy polyurethane resin can be obtained, for example, by using a modifier having at least one free isocyanate group and at least one masked isocyanate group, and reacting with the hydroxyl groups in the polyhydroxy polyurethane resin. This polyhydroxy polyurethane resin may preferably be a resin derived from a reaction of a 5-membered cyclic carbonate compound and an amine compound. As the 5-membered cyclic carbonate compound can be obtained by reacting an epoxy compound and carbon dioxide, the self-crosslinking polyhydroxy polyurethane resin is a material that also contributes to environmental conservation properties. The weather strip material according to the present invention may contain one or more binder resins other than the self-crosslinking polyhydroxy polyurethane resin according to the present invention.

When using the self-crosslinking polyhydroxy polyurethane resin according to the present invention as described above, the modification rate of the resin with the modifier may range preferably from 2 to 60%, more preferably from 5 to 40%. Its performance such as the abrasion resistance, chemical resistance and heat resistance after heat treatment can be controlled to some extent by the percentage of the modification rate. However, a modification rate of lower than 2% is not preferred, because properties required as a weather strip and obtainable by the achievement of sufficient crosslinking, such as heat resistance and chemical resistance, may not be obtained sufficiently. A modification rate of higher than 60%, on the other hand, is not preferred either, because the whitening resistance on bending suitable as a weather strip may be impaired and the possibility that demasked isocyanate groups would remain in the resin without any reaction may increase. It is to be noted that the modification rate of the hydroxyl groups in the polyhydroxy polyurethane resin with the modifier is calculated as follows.

Modification rate (%)={1-(hydroxyl groups in a resin after modification÷hydroxyl groups in the resin before modification)}×100

As mentioned above, the self-crosslinking polyhydroxy polyurethane resin according to the present invention, which is used as described above, can be readily obtained by reacting the modifier and polyhydroxy polyurethane resin in the presence or absence of an organic solvent and catalyst, at a temperature of from 0 to 150° C., preferably from 20 to 80° C., for from 30 minutes to 3 hours. However, it is necessary to pay attention to carrying out the reaction at a temperature of lower than the removal temperature of the masking agent during the reaction such that the modified polyhydroxy polyurethane resin has masked isocyanate groups in its structure.

<Diorganopolysiloxane>

As the diorganopolysiloxane that makes up the weather strip material according to the present invention and is to be added to the above-described self-crosslinking polyhydroxy polyurethane resin of the present invention, one having an average polymerization degree of from 5,000 to 10,000 is used. As such a diorganopolysiloxane, there is a linear, non-fluidity, rubbery silicone, which is readily available from the market. An organopolysiloxane (silicone) the average polymerization degree falls in such a range has a high viscosity. In a film formed from the weather strip material of the present invention which contains such an organopolysiloxane (silicone), the diffusion (bleeding) of the silicone to the surface of the film is, therefore, considered to proceed slowly.

The present inventors, therefore, infer that a weather strip is rendered possible to maintain its performance over a long term by forming, with the weather strip material of the present invention, a surface treatment layer at a slide contact portion of a high-molecular elastomer material as a base material, said slide contact portion being to be brought into sliding contact with another part. Commercially-available products include, for example, the high-viscosity silicone oil series produced by Shin-Etsu Chemical Co., Ltd., and the like, which are all usable in the pre sent invention. Specific examples include "KF96H-6,000 cs", "KF96H-10,000 cs", "KF96H-12,500 cs", "KF96H-30,000 cs", "KF96H-50,000 cs", "KF96H-60,000 cs", "KF96H-100,000 cs", "KF96H-300,000 cs", "KF96H-500,000 cs", "KF96H-1,000,000 cs" (all, trade names). Of these, "KF96H-6,000 cs" to "KF96H-50,000 cs" may be used preferably, with the use of "KF96H-10,000 cs" to "KF96H-30,000 cs" being more preferred.

<Silicone Oil>

In the weather strip material according to the present invention, a silicone oil of low kinematic viscosity, which has a kinematic viscosity in a range of from 100 to 10,000 CS, is added to the self-crosslinking polyhydroxy polyurethane resin in place of or in addition to the above-described diorganopolysiloxane (silicone). The addition of such a silicone oil of low viscosity in a small amount in addition to the above-described silicone of high viscosity makes it possible to control the diffusion (bleeding) of the silicone to the surface of the film, and therefore, to enlarge options for the silicone material. The silicone oil of low viscosity and the silicone oil of high viscosity may be used preferably at a ratio of from 3 to 20 or so to 100. The silicone oil may have or may not have active hydrogen atoms reactable with a polyisocyanate used as a crosslinking agent upon synthesis of the polyurethane resin for use in the present invention. It is to be noted that "CS" as used herein means "centistokes" [cSt] each of which is one hundredth of one stoke.

Such a diorganopolysiloxane and/or silicone oil as described above, which make up the weather strip material according to the present invention, may be added in a range of from 1 to 100 parts by mass, preferably from 3 to 70 parts by mass, more preferably from 10 to 30 parts by mass per 100 parts by mass of the self-crosslinking polyhydroxy polyurethane resin according to the present invention. A proportion of smaller than 1 parts by mass tends to result in unduly small effect by its addition, while a proportion of greater than 100 parts by mass tends to provide the resulting coating film with low strength. Proportions outside the above-described range are not preferred accordingly.

<Other Components>

The weather strip material according to the present invention may preferably be used in combination with one or more of fine organic powders and/or fine inorganic powders to matt the surface of the resulting surface treatment layer and to provide the surface treatment layer with improved abrasion resistance and lubricity. No particular limitation is imposed on the organic fine powders. Usable examples include acrylic resin particles, styrene resin particles, styrene-acrylic resin particles, phenol resin particles, melamine resin particles, acrylic-polyurethane resin particles, polyurethane resin particles, polyester resin particles, nylon resin particles, silicone resin particles, polyethylene resin particles, and the like. These powders may preferably have an average particle size in a range of from 1 to 50 μm. Their particle shapes may preferably be spherical or substantially spherical from a practical standpoint because the resulting coating film can be provided with particularly good surface properties and matte properties.

On the other hand, usable examples of the inorganic fine powders include talc, mica, calcium carbonate, barium sulfate, magnesium carbonate, clay, alumina, silica, carbon fibers, glass fibers, metal fibers, carbon black, titanium oxide, molybdenum, magnesium hydroxide, bentonite, graphite, and the like. As the average particle sizes of these powders, 10 μm or smaller can conform to the objects of the present invention, but powders having as smaller a particle size as possible are more preferred.

Such inorganic or organic fine particles as described above may be added in a proportion of from 1 to 150 parts by mass, preferably from 3 to 60 parts by mass per 100 parts by mass of the self-crosslinking polyhydroxy polyurethane resin according to the present invention. A proportion of smaller than 1 parts by mass tends to fail to sufficiently bring about its effect by the addition, while a proportion of greater than 150 parts by mass tends to provide the resulting coating film with significantly lowered mechanical/physical properties. Proportions outside the above-described range are not preferred accordingly.

The weather strip material, which is composed as a principal component of the self-crosslinking polyhydroxy polyurethane resin according to the present invention is basically an organic solvent solution or water dispersion (solution) with the above-described self-crosslinking polyhydroxy polyurethane resin contained therein. As an organic solvent preferably usable when de sired to prepare the weather strip material into an organic solvent solution, illustrative are dimethylformamide, dimethyl sulfoxide, dimethyl acetamide, N-methylpyrrolidone, N-ethylpyrrolidone, and the like. The concentration of the resin in the organic solvent may preferably be from 3 to 60 mass %. A resin concentration of lower than 3 mass % may lead to inferior film-forming properties, and may provide the resulting film with an insufficient thickness, and hence, with insufficient strength. A resin concentration of higher than 60 mass %, on the other hand, may lead to incomplete formation of a film after drying, and moreover, may raise such a problem that the organic solvent would remain in the resulting film.

When desired to prepare the weather strip material of the present invention into a water dispersion (solution), it is preferred to prepare the water dispersion (solution) as will be described hereinafter. First, the hydroxyl groups or NH groups in the self-crosslinking polyhydroxy polyurethane resin according to the present invention are half-esterified or half-amidated with an acid anhydride to introduce carboxyl groups into the resin. Subsequently, the carboxyl groups are preferably neutralized with ammonia, an organic amine compound, an inorganic base or the like to form carboxylate salt groups such that the resin can be used as a self-emulsified water dispersion. As the acid anhydride to be used as described above, illustrative are phthalic anhydride, trimellitic anhydride, hexahydrophthalic anhydride, and the like. On the other hand, examples of the organic amine compound include monoethanolamine, diethanolamine, triethanolamine, diethylethanolamine, aminoethylethanolamine, and the like. Further, the self-crosslinking polyhydroxy polyurethane resin may be a water dispersion emulsified with a surfactant in water by a method known per se in the art.

In the weather strip material according to the present invention, any desired one or more of conventionally-known various binder resins may be blended to provide improved adhesiveness and film-forming property when the weather strip material is applied to a high-molecular elastomer as a base material of a weather strip to form a surface treatment layer. As the binder resin or resins to be used as described above, those which are chemically reactable with the isocyanate groups formed as a result of the removal of the masking agent from the self-crosslinking polyhydroxy polyurethane resin, which is essential to the present invention, are preferred, although even those having no reactivity can be also used.

As these binder resins, binder resins which have been conventionally employed in the surface treatment of weather strips can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. When such a binder resin or binder resins are used in combination, its or their use proportion can be determined taking the functionality into consideration, and the binder resin or binder resins may be used in a range of from 5 to 90 mass %. Even when a binder resin or binder resins other than the self-crosslinking polyhydroxy polyurethane resin are used as much as 90 mass %, one considered to be a sufficiently environment-responsive product can be still obtained. To provide a product as an environment-responsive product which is also capable of more contributing to environment conservation properties, however, it is preferred to provide the product by using, in a greater proportion, the self-crosslinking polyhydroxy polyurethane resin obtained by using carbon dioxide as a raw material and containing carbon oxide fixed in its structure.

To the weather strip material according to the present invention, one or more of various coating additives such as surface control agents, fluidity control agents, ultraviolet absorbers, dispersants and anti-settling agents may be added suitably as needed.

The use of the weather strip material according to the present invention, which is composed of the resin composition prepared by adding a diorganopolysiloxane and/or a silicone oil to the above-described self-crosslinking polyhydroxy polyurethane resin of the present invention, makes it possible to form a weather strip having a surface treatment layer of excellent functionality. Described specifically, the coating and/or impregnation of the material of the present invention on and/or in a high-molecular elastomer can readily form a surface treatment layer of excellent functionality at a slide contact portion of the base material, where the base material is to be brought into sliding contact with another part. The surface treatment layer can be formed, for example, by applying the weather strip material of the present invention onto the high-molecular elastomer in accordance with a known coating method such as brush coating, spray coating, roll coating, gravure coating or dip coating to give a dry coat thickness of from 10 to 100 µm or so, and subsequent to drying, conducting heat treatment at a temperature of from 50 to 170° C. or so. Described specifically, when subjected to heat treatment, the masking agent is removed from the masked isocyanate groups in the molecule of the self-crosslinking polyhydroxy polyurethane resin to form isocyanate groups, and the isocyanate groups react with the free hydroxyl groups in the self-crosslinking polyhydroxy polyurethane resin to form a self-crosslinked film. As a result, a film is formed on the high-molecular elastomer for a weather strip, thereby providing a weather strip product having a surface treatment layer of excellent functionality.

As described above, the weather strip material according to the present invention contains the self-crosslinking polyhydroxy polyurethane resin according to the present invention and the specific diorganopolysiloxane and/or specific silicone oil. By forming the surface treatment layer on the high-molecular elastomer at the desired position thereof with the resin composition, a weather strip excellent in lubricity, abrasion resistance, heat resistance and weatherability and also in uniform matting effect can be obtained. Further, the self-crosslinking polyhydroxy polyurethane resin useful in the present invention can incorporate carbon dioxide in itself upon its synthesis, and therefore, enables the provision of a weather strip responsive to environmental conservation, which is effective from the viewpoint of the reduction of warming gas and has not been realized with conventional products.

EXAMPLES

The present invention will next be described in further detail based on specific production examples, examples and comparative examples, although the present invention shall not be limited to these examples. It is to be noted that the terms "parts" and "%" in the following examples are on a mass basis unless otherwise specifically indicated.

Production Example 1 (Production of Modifier)

While thoroughly stirring a 1:3 adduct of trimethylolpropane and hexamethylene diisocyanate ("COLONATE HL", trade name, product of Nippon Polyurethane Industry Co., Ltd.; NCO: 12.9%, solids content: 75%) (100 parts) and ethyl acetate (24.5 parts) at 100° C., ε-caprolactam (25.5 parts) was added, followed by a reaction for 5 hours. According to an infrared absorption spectrum (by "FT-720", HORIBA Ltd.) of the resulting modifier, an absorption of free isocyanate groups remained at 2,270 $cm^{-1}$. Upon quantification of those free isocyanate groups, they were found to amount to 1.8% at a solids content of 50% (cf. calculated value: 2.1%).

The structure of a principal compound in the modifier obtained as described above is presumed to be represented by the following formula.

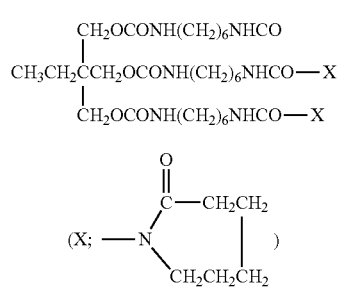

Production Example 2 (Production of Modifier)

While thoroughly stirring an adduct of hexamethylene diisocyanate and water ("DURANATE 24A-100", trade name, product of Asahi Kasei Corporation; NCO: 23.0%) (100 parts) and ethyl acetate (132 parts) at 80° C., methyl ethyl ketoxime (32 parts) was added, followed by a reaction for 5 hours. According to an infrared absorption spectrum of the resulting modifier, an absorption of free isocyanate groups remained at 2,270 $cm^{-1}$. Upon quantification of those free isocyanate groups, they were found to amount to 2.6% at a solids content of 50% (cf. calculated value: 2.9%).

The structure of a principal compound in the modifier obtained as described above is presumed to be represented by the following formula.

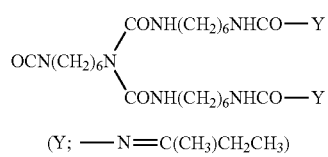

Production Example 3 (Production of Modifier)

While thoroughly stirring a 1:3 adduct of trimethylolpropane and tolylene diisocyanate ("COLONATE L", trade name, product of Nippon Polyurethane Industry Co., Ltd.; NCO: 12.5%, solids content: 75%) (100 parts) and ethyl acetate (67.3 parts) at 80° C., methyl ethyl ketoxime (17.3 parts) was added, followed by a reaction for 5 hours. According to an infrared absorption spectrum of the resulting modifier, an absorption of free isocyanate groups remained at 2,270 $cm^{-1}$. Upon quantification of those free isocyanate groups, they were found to amount to 2.0% at a solids content of 50% (cf. calculated value: 2.3%).

The structure of a principal compound in the modifier obtained as described above is presumed to be represented by the following formula.

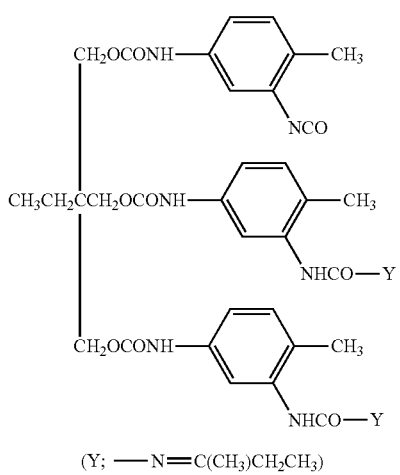

(Y; —N=C(CH₃)CH₂CH₃)

Production Example 4 (Production of 5-Membered Cyclic Carbonate Compound)

To a reaction vessel equipped with a stirrer, thermometer, gas inlet tube and reflux condenser, a divalent epoxy compound represented by the below-described formula (A) ("EPICOAT 828", trade name, product of Japan Epoxy Resin Co., Ltd.; epoxy equivalent: 187 g/mol) (100 parts), N-methylpyrrolidone (100 parts) and sodium iodide (1.5 parts) were added, followed by dissolution into a homogeneous solution.

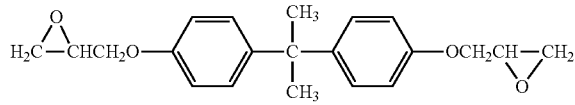

(A)

Subsequently, the solution was stirred under heating at 80° C. for 30 hours while bubbling carbon dioxide gas at a rate of 0.5 L/min. After completion of a reaction, the resultant reaction mixture was gradually added into n-hexane (300 parts) while stirring the latter at a high speed of 300 rpm. The resulting powdery reaction product was collected by a filter, and then washed with methanol to eliminate N-methylpyrrolidone and sodium iodide. The powder was dried in a drier to obtain, as a white powder, a 5-membered cyclic carbonate compound (1-A) (118 parts, yield: 95%).

In an infrared absorption spectrum (by "FT-720", HORIBA, Ltd.) of the thus-obtained reaction product (1-A), a peak around 910 cm$^{-1}$, which is attributable to the epoxy groups in the raw material, practically disappeared with respect to the reaction product, but an absorption of carbonyl groups in a cyclic carbonate group, which did not exist in any raw material, was confirmed around 1,800 cm$^{-1}$. The number average molecular weight of the reaction product was 414 (polystyrene equivalent; by "GPC-8220", Tosoh Corporation). In the thus-obtained 5-membered cyclic carbonate compound (1-A), carbon dioxide was fixed as much as 19%.

Production Example 5 (Production of 5-Membered Cyclic Carbonate Compound))

Using a divalent epoxy compound represented by the below-described formula (B) ("YDF-170", trade name, product of Tohto Kasei Co., Ltd.; epoxy equivalent: 172 g/mol) in place of the divalent epoxy compound (A) used in Production Example 4, a reaction was conducted as in Production Example 4 to obtain, as a white powder, a 5-membered cyclic carbonate compound (1-B) (121 parts, yield: 96%).

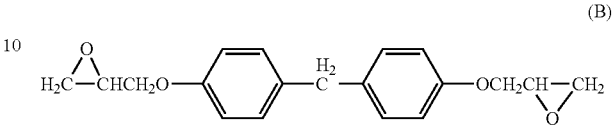

(B)

The reaction product was identified by infrared absorption spectroscopy, GPC and NMR as in Production Example 4. In the thus-obtained 5-membered cyclic carbonate compound (1-B), carbon dioxide was fixed as much as 20.3%.

Production Example 6 (Production of 5-Membered Cyclic Carbonate Compound)

Using "EX-212" of the below-described formula (C) (trade name, product of Nagase ChemteX Corporation; epoxy equivalent: 151 g/mol) in place of the divalent epoxy compound (A) used in Production Example 4, a reaction was conducted as in Production Example 4 to obtain, as a colorless clear liquid, a 5-membered cyclic carbonate compound (1-C) (111 parts, yield: 86%).

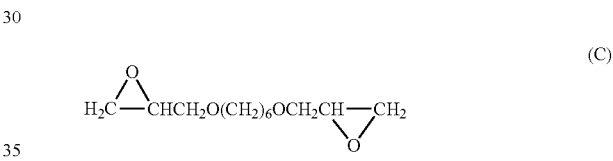

(C)

The reaction product was identified by infrared absorption spectroscopy, GPC and NMR as in Production Example 4. In the thus-obtained 5-membered cyclic carbonate compound (1-C), carbon dioxide was fixed as much as 22.5%.

Example 1 (Production of Self-Crosslinking Polyhydroxy Polyurethane Resin Solution)

A reaction vessel equipped with a stirrer, thermometer, gas inlet tube and reflux condenser was purged with nitrogen. To the reaction vessel, the 5-membered cyclic carbonate compound (100 parts) obtained in Production Example 4 was added, and further, N-methylpyrrolidone was added to adjust the solids content to 35%, followed by dissolution into a homogeneous solution. Hexamethylenediamine (27.1 parts) was then added, and the resulting mixture was stirred at a temperature of 90° C. for 10 hours so that a reaction was conducted until hexamethylenediamine became no longer detectable. The modifier of Production Example 1 was next added as much as 20 parts (solids content: 50%), followed by a reaction at 90° C. for 3 hours. Upon confirmation of disappearance of an absorption of isocyanate groups in an infrared absorption spectrum, the self-crosslinking polyhydroxy polyurethane resin solution of this example was obtained.

Examples 2 to 6 (Production of Self-Crosslinking Polyhydroxy Polyurethane Resin Solutions)

Similar to Example 1, the 5-membered cyclic carbonate compounds, polyamine compounds and modifiers shown in Table 1 were then combined and reacted, respectively, in a similar manner as in Example 1 to obtain the self-crosslinking polyhydroxy polyurethane resin solutions of Examples 2 to 6 described in Table 1.

Comparative Example 1 (Production of Polyhydroxy Polyurethane Resin)

A polyhydroxy polyurethane resin solution was used as in Example 1 except that the modifier of Production Example 1, which was employed in Example 1, was not used.

the reaction vessel, polybutylene adipate (average molecular weight: approx. 2,000) (150 parts) and 1,4-butanediol (15 parts) were dissolved in dimethylformamide (250 parts). Subsequently, under thorough stirring at 60° C., a solution of hydrogenated MDI (methylene bis(1,4-cyclohexane)-diisocyanate) (62 parts) in dimethylformamide (171 parts) was gradually added dropwise, and after completion of the dropwise addition, a reaction was conducted at 80° C. for 6 hours. The reaction mixture had a viscosity of 3.2 MPa·s (25° C.) at a solids content of 35%. A film obtained from the

TABLE 1

Compositions and Physical Properties of Self-crosslinking Polyhydroxy Polyurethane Resins

|  | Example 1 | Example 2 | Example 3 | Example 4 | Comp. Ex. 1 |
|---|---|---|---|---|---|
| Carbonate compound (i) | 1-A | 1-A | 1-B | 1-B | 1-A |
| Amine compound (ii) | HMDA[1] | HMDA | HMDA | HMDA | HMDA |
| Molar ratio (i/ii) | 1.0 | 1.0 | 1.0 | 1.0 | 1.0 |
| Modifier | Production Example 1 | Production Example 2 | Production Example 2 | Production Example 3 | — |
| Solids content ratio (resin/modifier) | 100/10 | 100/15 | 100/10 | 100/15 | — |
| Solution viscosity (35% conc., MPa · s) | 1.8 | 2.1 | 1.9 | 2.2 | 1.3 |
| Number average molecular weight | 43,000 | 75,000 | 46,000 | 78,000 | 35,000 |
| Hydroxyl number (mgKOH/g) | 185 | 172 | 196 | 190 | 214 |
| Fixed amount of carbon dioxide (%)[2] | 13.8 | 13.2 | 15.5 | 14.8 | 15.2 |

|  | Example 5 | Example 6 |
|---|---|---|
| Carbonate compound (i) | 1-C | 1-C |
| Amine compound (ii) | HMDA[1] | HMDA |
| Molar ratio (i/ii) | 1.0 | 1.0 |
| Modifier | Production Example 2 | Production Example 3 |
| Solids content ratio (resin/modifier) | 100/10 | 100/15 |
| Solution viscosity (35% conc., MPa · s) | 1.4 | 2.0 |
| Number average molecular weight | 41,000 | 72,000 |
| Hydroxyl number (mgKOH/g) | 208 | 191 |
| Fixed amount of carbon dioxide (%)[2] | 16.7 | 15.3 |

[1]Hexamethylenediamine
[2]Calculated value

Comparative Example 2-1 (Production of Polyester Polyurethane Resin)

A polyester polyurethane resin for use in this Comparative Example was synthesized as will be described below. A reaction vessel equipped with a stirrer, thermometer, gas inlet tube and reflux condenser was purged with nitrogen. In the reaction vessel, polybutylene adipate (average molecular weight: approx. 2,000) (150 parts) and 1,4-butanediol (15 parts) were dissolved in a mixed organic solvent consisting of methyl ethyl ketone (200 parts) and dimethylformamide (50 parts). Subsequently, under thorough stirring at 60° C., a solution of hydrogenated MDI (methylene bis(1,4-cyclohexane)-diisocyanate) (62 parts) in dimethylformamide (171 parts) was gradually added dropwise, and after completion of the dropwise addition, a reaction was conducted at 80° C. for 6 hours. The reaction mixture had a viscosity of 3.2 MPa·s (25° C.) at a solids content of 35%.

Comparative Example 2-2 (Production of Polyester Polyurethane Resin)

A polyester polyurethane resin for use in this Comparative Example was synthesized as will be described below. A reaction vessel equipped with a stirrer, thermometer, gas inlet tube and reflux condenser was purged with nitrogen. In reaction mixture had a breaking strength of 45 MPa, a breaking extension of 480%, and a thermal softening temperature of 110° C.

Comparative Example 3-1 (Production of Polycarbonate Polyurethane Resin)

Similar to Comparative Example 2-1, polycarbonate diol (product of UBE INDUSTRIES, LTD.; average molecular weight: approx. 2,000) (150 parts) and 1,4-butanediol (15 parts) were dissolved in a mixed organic solvent consisting of methyl ethyl ketone (200 parts) and dimethylformamide (50 parts). Subsequently, under thorough stirring at 60° C., a solution of hydrogenated MDI (62 parts) in dimethylformamide (171 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

Comparative Example 3-2 (Polycarbonate Polyurethane Resin)

A polycarbonate polyurethane resin for use in this Comparative Example was synthesized as will be described below. Similar to Comparative Example 2-2, polycarbonate diol (product of UBE INDUSTRIES, LTD.; average molecular weight: approx. 2,000) (150 parts) and 1,4-butanediol (15 parts) were dissolved in dimethylformamide (250 parts). Subsequently, under thorough stirring at 60° C., a solution of hydrogenated MDI (62 parts) in dimethylformamide (171 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

Evaluation

Using the respective resin solutions of Examples 1 to 4, Comparative Example 1, and Comparative Example 2-1, films were produced by the casting method. With respect to each film so obtained, the below-described properties were determined by the below-described methods to rank the properties of the self-crosslinking polyhydroxy polyurethane resins. As casting conditions, after having been dried at 100° C. for 3 minutes, heat treatment was conducted at 160° C. for 30 minutes.

(Mechanical Properties) Tensile Strength, Elongation

With respect to each film, its mechanical properties (tensile strength, elongation) were ranked following JIS K7311. The results are shown in Table 2.

(Thermal Softening Temperature)

With respect to each film, its thermal softening temperature was ranked following JIS K7206 (Vicat softening temperature measuring method). The results are shown in Table 2.

(Abrasion Resistance)

With respect to each film, its abrasion resistance was ranked following JIS K7311. The results are shown in Table 2.

(Solvent Resistance)

Following JIS K5600-6-1, each film was observed for any change in external appearance after immersion for 10 minutes in toluene controlled at 50° C., whereby its solvent resistance was ranked. The results are shown in Table 2.

(Environmental Responsiveness)

The environmental responsiveness of each film was ranked "A" or "B" depending on whether or not carbon dioxide was fixed in it. The results are shown in Table 2.

TABLE 2

Ranking Results of Resins

|  | Ex. 1 | Ex. 2 | Ex. 3 | Ex. 4 | Comp. Ex. 1 | Comp. Ex. 2-1 |
|---|---|---|---|---|---|---|
| Tensile strength (MPa) | 52 | 61 | 48 | 55 | 21 | 45.0 |
| Elongation (%) | 9 | 6 | 7 | 5 | 15 | 480 |
| Thermal softening temperature | 200 | 210 | 204 | 210 | 98 | 110 |
| Abrasion resistance (mg) | 20 | 11 | 17 | 8 | 85 | 55 |
| Solvent resistance | No change | No change | No change | No change | Swollen | Swollen |
| Environmental responsiveness | A | A | A | A | A | B |

As shown in Table 2, sufficient crosslinking was confirmed to have proceeded in the films obtained using the resins of Examples 1 to 4. Further, the self-crosslinking polyhydroxy polyurethane resins of Examples 1 to 4 were confirmed to show equal or better performance on the above-described test items compared with the conventional polyester polyurethane resin of Comparative Example 2-1.

Examples 7 to 14 & Comparative Examples 4 to 9
(Production of Imitation Leathers)

Separately using the resin solutions of Example 1, Example 2, Example 5, Example 6, Comparative Example 1, Comparative Example 2-2 and Comparative Example 3-2 prepared above, coating formulations for imitation leathers were prepared. Using those coating formulations, imitation leathers were produced, and were ranked by methods to be described subsequently herein. The compositions and ranking results are shown in Tables 3-1 and 3-2.

(Artificial Leathers)

The resin solutions obtained in Examples 1, 2, 5 and 6 and Comparative Examples 1, 2-2 and 3-2 were applied onto nonwoven fabrics made of polystyrene-polyester fibers to give a thickness of 1 mm, respectively. The thus-coated non-woven fabrics were immersed in a 10% aqueous solution of DMF controlled at 25° C., so that the resins were solidified. After washing, drying was conducted under heat (150° C./10 minutes) to obtain artificial leathers having porous layers as sheets.

(Synthetic Leathers)

A base material sheet for imitation leathers was prepared by coating and drying under heat a solution of a polyurethane-based resin ("LETHAMINE UD-602S", trade name, product of Dainichiseika Color & Chemicals Mfg., Co., Ltd.) as an adhesive layer on a woven fabric to give a dry coat thickness of 10 μm. On the other hand, the resin solutions obtained in Examples 1, 2, 5 and 6 and Comparative Examples 1, 2-2 and 3-2 were separately coated on sheets of release paper and dried under heat (150° C./10 minutes) to form films of approx. 15 μm thickness, respectively. The thus-obtained films were bonded to cut pieces of the above-obtained base material sheet to obtain synthetic leathers, respectively.

Evaluation

Using the respective imitation leathers obtained as artificial leathers and synthetic leathers as described above, ranking was performed by the below-described methods and standards.

(Hand Feeling)

The hand feeling of each imitation leather was ranked, based on a hand touch feeling, in accordance with the following standards. The results are shown in Table 3-1 and Table 3-2.

A: Soft
B: A little hard
C: Hard (Chemical Resistance)

Onto the surface of each synthetic leather obtained as described above, toluene was dropped. For allowing the surface to always remain in a wet state, the solvent was additionally dropped. One hour later, the solvent was wiped off. The chemical resistance of the synthetic leather was ranked in accordance with the following standards, and the results are shown in Table 3-2.

A: No trace of dropping was observed at all on the coated surface.
B: A change such as a slight trace of dropping or swelling was recognized, but it was not noticeable.
C: A change in surface conditions (swelling or the like) was clearly recognized.

(Surface Abrasion Resistance)

Using a plane abrasion tester, each synthetic leather obtained as described above was rubbed by reciprocating No. 6 canvas under a load of 1 kgf. The number of reciprocations until occurrence of a scratch was counted. The surface abrasion resistance of the synthetic leather was ranked in accordance with the following standards, and the results are shown in Table 3-2.

A: 5,000 reciprocations or more
B: 2,000 reciprocations or more, but less than 5,000 reciprocations
C: Less than 2,000 reciprocations (Thermal Softening Temperature)

The thermal softening temperature of the film, which had been obtained by conducting coating on a sheet of release paper and heating under heat (150° C./10 minutes) upon production of each of the above-described synthetic leathers, was measured following JIS K7206 (Vicat softening temperature measuring method). The results are shown in Table 3-2.

(Environmental Responsiveness)

The environmental responsiveness of each imitation leather was ranked "A" or "B" depending on whether or not carbon dioxide was fixed in the used resin. The results are shown in Table 3-1 and Table 3-2.

TABLE 3-1

Compositions of Coating Formulations for Imitation Leathers and Ranking Results (Artificial Leathers)

| Used resin solutions | Examples | | | | Comparative Examples | | |
|---|---|---|---|---|---|---|---|
| | 7 | 8 | 9 | 10 | 4 | 5 | 6 |
| Example 1 | 100 | — | — | — | — | — | — |
| Example 2 | — | 100 | — | — | — | — | — |
| Example 5 | — | — | 100 | — | — | — | — |
| Example 6 | — | — | — | 100 | — | — | — |
| Comparative Example 1 | — | — | — | — | 100 | — | — |
| Comparative Example 2-2 | — | — | — | — | — | 100 | — |
| Comparative Example 3-2 | — | — | — | — | — | — | 100 |
| Hand feeling | B | B | A | A | B | A | A |
| Environmental responsiveness | A | A | A | A | A | B | B |

TABLE 3-2

Compositions of Coating Formulations for Imitation Leathers and Ranking Results (Synthetic Leathers)

| Used resin solutions | Examples | | | | Comparative Examples | | |
|---|---|---|---|---|---|---|---|
| | 11 | 12 | 13 | 14 | 7 | 8 | 9 |
| Example 1 | 100 | — | — | — | — | — | — |
| Example 2 | — | 100 | — | — | — | — | — |
| Example 5 | — | — | 100 | — | — | — | — |
| Example 6 | — | — | — | 100 | — | — | — |
| Comparative Example 1 | — | — | — | — | 100 | — | — |
| Comparative Example 2-2 | — | — | — | — | — | 100 | — |
| Comparative Example 3-2 | — | — | — | — | — | — | 100 |
| Hand feeling | B | B | A | A | B | A | A |
| Chemical resistance | A | A | A | A | C | C | C |
| Surface abrasion resistance | A | A | A | A | C | C | B |
| Thermal softening point (° C.) | 200 | 210 | 193 | 210 | 98 | 110 | 135 |
| Environmental responsiveness | A | A | A | A | A | B | B |

Examples 15 to 22 & Comparative Examples 10 to 15 (Production of Skin Materials)

Separately using the resin solutions of Examples 1 to 4, Comparative Example 1, Comparative Example 2-1 and Comparative Example 3-1, coating formulations for forming top coat layers, the compositions of which are described in Tables 4 and 5, were prepared. Evaluation sheets of skin materials, which had the top coat layers on the surfaces thereof, were then formed by a method to be described subsequently herein. Using those evaluation sheets, they were ranked for moldability, gloss value, adhesiveness, scratch resistance, oil resistance, chemical resistance, surface abrasion resistance, and environmental responsiveness by the below-described methods.

(Formation Method of Top Coat Layers)

Employed was a base material sheet of a thermoplastic polyolefin, which had been subjected to corona discharge treatment to activate its surface to a wetting index of 45 dyn/cm. Onto the resulting base material sheet, chlorinated polypropylene ("SUPERCHLON", trade name, product of Nippon Paper Chemicals Co., Ltd.) was coated by a 120-mesh gravure roll to give a dry coat thickness of 3 μm, followed by drying at 100° C. for 2 minutes to form a primer layer. Onto cut pieces of the thus-formed coating film, the coating formulations for forming top coat layers as described in Table 2 were applied, respectively, by a 120-mesh gravure roll to give a dry coat thickness of 5 μm. The coating formulations so applied were dried at 150° C. for 3 minutes, and subsequent to aging at 80° C. for 24 hours, the resulting skin materials were molded by a vacuum molding machine equipped with a convex mold controlled at 160° C. at a surface thereof, whereby molded products (skin materials) with the top coat layers formed on the surfaces thereof were obtained, respectively. Using the thus-obtained molded products, evaluation was performed in accordance with the below-described standards. The results are collectively shown in Table 4 and Table 5.

Evaluation (Moldability)

The surface of each sheet after its vacuum molding was visually observed and ranked.

A: Good (No molding cracking or whitening phenomenon)
B: Bad (Either molding cracking or whitening phenomenon was observed)

(Gloss Value)

Following JIS K5600, the surface of each sheet after its vacuum molding was measured by a gloss meter. One having a gloss value of 1.2 or smaller (standard value required in the relevant business field) was set to pass.

(Adhesiveness)

On the surface of each coating film as a skin after the vacuum molding, a cross-cut cellophane tape peeling test was conducted to rank its adhesiveness.
- A: Good (No peeled portion in the coated surface)
- B: Bad (Peeled area at the coated surface)

(Scratch Resistance)

The surface of each coating film as a skin after the vacuum molding was rubbed with a nail. By visually observing whether or not a trace of scratch or whitening had occurred, the scratch resistance of the sheet was ranked.
- A: Good (Nail scratch or whitening was hardly noticeable at the coated surface)
- B: Bad (Nail scratch or a trace of whitening was clearly noticeable at the coated surface)

(Oil Resistance)

The surface of each coating film as a skin was coated over a radius of 2 cm with beef tallow (Nacalai Tesque, Inc.), and the coating film so coated was left over for 5 days in an atmosphere controlled at 80° C. Subsequently, the beef tallow was removed. On the coated surface, a cross-cut cellophane tape peeling test was conducted to rank the oil resistance of the coating film in accordance with the same standards as in the case of scratch resistance.

(Chemical Resistance)

Onto the surface of each coating film as a skin, ethanol was dropped. For allowing the surface to always remain in a wet state, the solvent was additionally dropped. One hour later, the solvent was wiped off.
- A: No trace of dropping was observed at all on the coated surface.
- B: A slight trace of dropping was recognized, but it was not noticeable.
- C: A clear trace of dropping was recognized.

(Surface Abrasion Resistance)

Using a plane abrasion tester, the surface of each coating film as a skin was rubbed by reciprocating No. 6 canvas under a load of 1 kgf. The number of reciprocations until occurrence of a scratch was counted.
- A: 5,000 reciprocations or more
- B: 2,000 reciprocations or more, but less than 5,000 reciprocations
- C: Less than 2,000 reciprocations (Environmental Responsiveness)

The environmental responsiveness of each coating film as a skin was ranked "A" or "B" depending on whether or not carbon dioxide was fixed in the used resin.

TABLE 4

Compositions of Coating Formulations for Forming Top Coat Layers and Ranking Results

| Examples | | 15 | 16 | 17 | 18 | 19 | 20 | 21 | 22 |
|---|---|---|---|---|---|---|---|---|---|
| Primer | | Chlorinated polypropylene | | | | | | | |
| Resin solution of Example 1 | | 100 | 100 | — | — | — | — | — | — |
| Resin solution of Example 2 | | — | — | 100 | 100 | — | — | — | — |
| Resin solution of Example 3 | | — | — | — | — | 100 | 100 | — | — |
| Resin solution of Example 4 | | — | — | — | — | — | — | 100 | 100 |
| Matting | Resin particles[a] | 35 | 25 | 35 | 25 | 35 | 25 | 35 | 25 |
| agents | Silica[b] | — | 10 | — | 10 | — | 10 | — | 10 |
| Moldability | | A | A | A | A | A | A | A | A |
| Gloss value | | 0.9 | 0.7 | 0.9 | 0.7 | 1.0 | 0.9 | 0.9 | 0.7 |
| Adhesiveness | | A | A | A | A | A | A | A | A |
| Scratch resistance | | A | A | A | A | A | A | A | A |
| Oil resistance | | A | A | A | A | A | A | A | A |
| Chemical resistance | | A | A | A | A | A | A | A | A |
| Surface abrasion resistance | | A | A | A | A | A | A | A | A |
| Environmental responsiveness | | A | A | A | A | A | A | A | A |

[a] "FINE POLYURETHANE PARTICLES" (product of Dainichiseika Color & Chemicals Mfg., Co., Ltd., average particle size: 5 μm)
[b] "NIPSIL" (product of Nippon Silica Industry Co., Ltd.)

TABLE 5

Compositions of Coating Formulations for Forming Top Coat Layers and Ranking Results

| Comparative Examples | | 10 | 11 | 12 | 13 | 14 | 15 |
|---|---|---|---|---|---|---|---|
| Primer layer material | | Chlorinated polypropylene | | | | | |
| Resin solution of Comp. Ex. 1 | | 100 | 100 | — | — | — | — |
| Resin solution of Comp. Ex. 2-1 | | — | — | 100 | 100 | — | — |
| Resin solution of Comp. Ex. 3-1 | | — | — | — | — | 100 | 100 |
| Matting | Resin particles[a] | 35 | 25 | 35 | 25 | 35 | 25 |
| agents | Silica[b] | — | 10 | — | 10 | — | 10 |
| Moldability | | A | A | A | A | A | A |
| Gloss value | | 0.9 | 0.7 | 0.9 | 0.7 | 1.0 | 0.9 |
| Adhesiveness | | A | B | B | C | B | C |
| Scratch resistance | | B | C | B | C | B | C |
| Oil resistance | | B | B | B | B | B | B |
| Chemical resistance | | C | C | C | C | C | C |

TABLE 5-continued

Compositions of Coating Formulations for Forming
Top Coat Layers and Ranking Results

| Comparative Examples | 10 | 11 | 12 | 13 | 14 | 15 |
|---|---|---|---|---|---|---|
| Surface abrasion resistance | B | C | B | C | B | C |
| Environmental responsiveness | A | A | B | B | B | B |

[a]"FINE POLYURETHANE PARTICLES" (product of Dainichiseika Color & Chemicals Mfg., Co., Ltd., average particle size: 5 μm)
[b]"NIPSIL" (product of Nippon Silica Industry Co., Ltd.)

Examples 23 to 30 & Comparative Examples 16 to 21 (Production of Weather Strip Materials)

Using the resin solutions (coating formulations) of Examples 1 to 4, Comparative Example 1, Comparative Example 2-1 and Comparative Example 3-1, coating formulations of the compositions described in Tables 6 and 7 were prepared. Those coating formulations were then applied by an air spray gun onto EPDM rubber sheets, followed by drying at 140° C. for 10 minutes to form films of 20 μm on the sheets, respectively. The EPDM rubber sheets, which had been obtained as described above and had the films, were provided as measurement samples for the ranking of the surface treatment layers (films) formed with the respective weather strip materials.

Evaluation

The weather strip materials (coating formulations) obtained as described above and the above-described respective measurement samples were measured for coefficient of static friction, coefficient of kinetic friction, contact angle, adhesiveness, abrasion durability, weatherability and the like by the below-described methods, and the materials of the examples and comparative examples were ranked. Ranking results are collectively shown in Tables 6 and 7.

(Coefficient of Static Friction, Coefficient of Kinetic Friction)

The coefficient of static friction and coefficient of kinetic friction of each weather strip material (coating formulation) against a glass member were measured by a surface property tester (manufacture by Shinto Scientific Co., Ltd.).

(Contact Angle)

The contact angle to water at the film portion of each measurement sample obtained as described above was measured by a contact angle meter (manufactured by Kyowa Interface Science Co., Ltd.), and was recorded as the contact angle of the film, which was formed by using the corresponding weather strip material, to water.

(Adhesiveness)

On the film portion of each measurement sample obtained as described above, a peeling test was conducted by the cross-cut cellophane tape peeling test. The adhesiveness of the surface of the film formed from the corresponding weather strip material was ranked in accordance with the following standards.

A: Good (No peeled portion in the film surface)
B: Bad (Peeled area on the film surface)

(Abrasion Durability)

A glass plate was brought under a load of 9.8 N into contact with the film portion of each measurement sample obtained as described above, and the glass plate was reciprocated. The number of reciprocations until occurrence of a tear or the like in the film was counted by the surface property tester (manufacture by Shinto Scientific Co., Ltd.). Based on the number of the reciprocations so counted, the abrasion durability of the surface of the film formed from the corresponding weather strip material was ranked.

(Weatherability Test)

Using a "SUNSHINE CARBON ARC WEATHER METER" (Suga Test Instruments Co., Ltd.), the film portion of each measurement sample obtained as described above was exposed to light at a panel temperature of 83° C. for 200 hours. The conditions of the surface of the film were then visually observed, and the weatherability of the surface of the film formed from the corresponding weather strip material was ranked in accordance with the following standards.

3: No changes in surface conditions
2: Some changes in surface conditions
1: Significant changes and whitening phenomenon (Environmental Responsiveness)

The environmental responsiveness of each weather strip material was ranked "A" or "B" depending on whether or not carbon dioxide was fixed in the resin contained in the weather strip material (coating formulation).

TABLE 6

Compositions of Weather Strip Materials and Their Ranking

| | Examples | 23 | 24 | 25 | 26 | 27 | 28 | 29 | 30 |
|---|---|---|---|---|---|---|---|---|---|
| Resin solutions | Example 1 | 100 | 100 | — | — | — | — | — | — |
| | Example 2 | — | — | 100 | 100 | — | — | — | — |
| | Example 3 | — | — | — | — | 100 | 100 | — | — |
| | Example 4 | — | — | — | — | — | — | 100 | 100 |
| Matting agents | Resin particles[a] | — | 25 | — | 25 | — | 25 | — | 25 |
| | Silica[b] | — | 10 | — | 10 | — | 10 | — | 10 |
| Diorganopolysiloxane[c] | | 20 | 20 | 20 | 20 | 20 | 20 | 20 | 20 |
| Coefficient of static friction | | 0.48 | 0.35 | 0.45 | 0.32 | 0.52 | 0.38 | 0.50 | 0.32 |
| Coefficient of kinetic friction | | 0.17 | 0.15 | 0.17 | 0.15 | 0.17 | 0.15 | 0.17 | 0.16 |
| Contact angle (°) | | 107 | 114 | 108 | 115 | 108 | 112 | 108 | 114 |
| Adhesiveness | | A | A | A | A | A | A | A | A |
| Abrasion durability (×10$^4$ reciprocations) | | 12 | 15 | 13 | 16 | 13 | 15 | 12 | 14 |

TABLE 6-continued

Compositions of Weather Strip Materials and Their Ranking

| Examples | 23 | 24 | 25 | 26 | 27 | 28 | 29 | 30 |
|---|---|---|---|---|---|---|---|---|
| Weatherability test | 3 | 3 | 3 | 3 | 3 | 3 | 3 | 3 |
| Environmental responsiveness | A | A | A | A | A | A | A | A |

[a]"FINE POLYURETHANE PARTICLES" (product of Dainichiseika Color & Chemicals Mfg., Co., Ltd., average particle size: 5 μm)
[b]"NIPSIL" (product of Nippon Silica Industry Co., Ltd.)
[c]"KF96H-10,000 cs" (product of Shin-Etsu Chemical Co., Ltd.)

TABLE 7

Compositions of Weather Strip Materials and Their Ranking

| Comparative Examples | | 16 | 17 | 18 | 19 | 20 | 21 |
|---|---|---|---|---|---|---|---|
| Resin solutions | Comp. Ex. 1 | 100 | 100 | — | — | — | — |
| | Comp. Ex. 2-1 | — | — | 100 | 100 | — | — |
| | Comp. Ex. 3-1 | — | — | — | — | 100 | 100 |
| Matting agents | Resin particles[a] | — | 25 | — | 25 | — | 25 |
| | Silica[b] | — | 10 | — | 10 | — | 10 |
| Diorganopolysiloxane[c] | | 20 | 20 | 20 | 20 | 20 | 20 |
| Coefficient of static friction | | 0.52 | 0.42 | 0.63 | 0.55 | 0.57 | 0.50 |
| Coefficient of kinetic friction | | 0.17 | 0.15 | 0.17 | 0.15 | 0.17 | 0.15 |
| Contact angle (°) | | 108 | 114 | 108 | 115 | 108 | 112 |
| Adhesiveness | | A | A | B | B | B | B |
| Abrasion durability (×10$^4$ reciprocations) | | 7 | 9 | 5 | 8 | 7 | 10 |
| Weatherability test | | 3 | 3 | 1 | 1 | 2 | 2 |
| Environmental responsiveness | | A | A | B | B | B | B |

[a]"FINE POLYURETHANE PARTICLES" (product of Dainichiseika Color & Chemicals Mfg., Co., Ltd., average particle size: 5 μm)
[b]"NIPSIL" (product of Nippon Silica Industry Co., Ltd.)
[c]"KF96H-10,000 cs" (product of Shin-Etsu Chemical Co., Ltd.)

INDUSTRIAL APPLICABILITY

According to the present invention, it becomes possible to provide a polyhydroxy polyurethane resin, the development of applications of which has not moved ahead although it is considered to contribute to the resolution of problems such as global warming and resource depletion, as a self-crosslinking polyhydroxy polyurethane resin effectively usable for industrial applications. Owing to the use of the self-crosslinking polyhydroxy polyurethane resin according to the present invention, formed products can be also sufficiently satisfactory in performance such as heat resistance, chemical resistance and abrasion resistance although they are environment-responsive products which contain carbon dioxide incorporated therein and can contribute to the reduction of warming gas. Therefore, the self-crosslinking polyhydroxy polyurethane resin is also expected to find active utility from the standpoint of the conservation of the global environment.

The imitation leather according to the present invention is provided with excellent scratch resistance, abrasion resistance, chemical resistance and heat resistance, because owing to the use of the resin composition composed as a principal component of the above-described self-crosslinking polyhydroxy polyurethane resin, the masked isocyanate groups, which are contained in the structure of the resin and are demasked by heat, and the hydroxyl groups in the polyhydroxy polyurethane resin in the resin react to form a crosslinked resin. As a result, it becomes possible to provide an imitation leather product, which is responsive to environmental conservation and has not been realized with conventional products. Consequently, it is possible to contribute to the resolution of problems, such as global warming and resource depletion, which has become a worldwide issue in recent years.

The skin material according to the present invention, which is made of a thermoplastic polyolefin resin, is excellent in scratch resistance, abrasion resistance, chemical resistance and heat resistance, and further, is also excellent in uniform matting effect, because the top coat layer on the thermoplastic olefin resin sheet has been formed with the resin composition composed, as a principal component, of the self-crosslinking polyhydroxy polyurethane resin and has been formed as a self-crosslinked film by the demasking of the masked isocyanate groups in the resin under heat and the reaction of the demasked isocyanate groups and the free hydroxyl groups in the polyhydroxy polyurethane resin. As a result, it becomes possible to provide a skin material responsive to environmental conservation, the provision of which has not been realized with conventional products. The use of skin materials can hence be enlarged, thereby making it possible to contribute to the resolution of problems such as global warming and resource depletion, which has become a worldwide issue in recent years.

The weather strip material according to the present invention is excellent in lubricity, abrasion resistance, heat resistance and weatherability, and further, is also excellent in uniform matting effect, because the weather strip material is a resin composition containing the self-crosslinking polyhydroxy polyurethane resin and one or more additives and the masked isocyanate groups, which are contained in the structure of the resin and are demasked by heat, and the hydroxyl groups in the resin react to form a crosslinked resin. As a result, the surface treatment layer formed by using the weather strip material is excellent in performance. As the self-crosslinking polyhydroxy polyurethane resin for use in the present invention is a useful material which contains carbon dioxide incorporated and fixed therein and contributes to the resolution of problems such as global warming and resource depletion, the weather strip material which is obtained by using the material can also provide products responsive to environmental conservation, the provision of which has not been realized with conventional products. The use of the weather strip material is, therefore, expected to expand from this respect.

The invention claimed is:

1. A self-crosslinking polyhydroxy polyurethane resin, wherein the self-crosslinking polyhydroxy polyurethane resin comprises in a structure thereof:
    a polyhydroxy polyurethane consisting of a reaction product consisting of a 5-membered cyclic carbonate compound and a diamine compound as reactants, where the diamine compound is a compound selected from the group consisting of a diamine compound having only two primary amine groups as amine groups, aminoethylethanolamine, hydroxyethylaminopropylamine, and mixtures thereof;
    a modifier; and
    at least one masked isocyanate group,
  the self-crosslinking polyhydroxy polyurethane resin consists of the polyhydroxy polyurethane having been modified with the modifier, as polyurethane, and
  a modification ratio of the self-crosslinking polyhydroxy polyurethane resin modified with the modifier is in a range from 2% to 60%,
    wherein the modifier has at least one free isocyanate group and the at least one masked isocyanate group before the modification of the polyhydroxy polyurethane, and
    the modification ratio of the self-crosslinking polyhydroxy polyurethane resin is obtained by a following formula:

modification ratio (%)={1-(hydroxyl groups in the polyhydroxy polyurethane in the self-crosslinking polyhydroxy polyurethane resin after modification/hydroxyl groups in the polyhydroxy polyurethane before modification)}×100.

2. The self-crosslinking polyhydroxy polyurethane resin according to claim 1,
    wherein the 5-membered cyclic carbonate compound is a reaction product of an epoxy compound and carbon dioxide, and contains, in a structure of the 5-membered cyclic carbonate compound, a —O—C(O)— group derived from the carbon dioxide in a range from 1 to 25 mass %.

3. The self-crosslinking polyhydroxy polyurethane resin according to claim 1,
    wherein the masked isocyanate groups are reaction products of organic polyisocyanate groups and a masking agent,
    the self-crosslinking polyhydroxy polyurethane resin is capable of self-crosslinking,
    when the self-crosslinking polyhydroxy polyurethane resin is subjected to a heat treatment, the masked isocyanate groups are demasked and form isocyanate groups, and
    the isocyanate groups react with hydroxyl groups in the structure of the self-crosslinking polyhydroxy polyurethane resin, so that the self-crosslinking polyhydroxy polyurethane resin undergoes self-crosslinking.

4. A process for producing the self-crosslinking polyhydroxy polyurethane resin according to claim 1, the process comprising:
    reacting the at least one free isocyanate group of the modifier, with hydroxyl groups in the polyhydroxy polyurethane, so as to obtain the self-crosslinking polyhydroxy polyurethane resin having been modified with the modifier and having the masked isocyanate groups in the structure thereof.

5. The process according to claim 4,
    wherein the 5-membered cyclic carbonate compound is a reaction product of an epoxy compound and carbon dioxide, and
    the carbon dioxide is contained in a range from 1 to 25 mass % in the self-crosslinking polyhydroxy polyurethane resin.

6. The process according to claim 4, wherein the modifier is a reaction product of an organic polyisocyanate compound and a masking agent.

7. A resin material comprising:
    the self-crosslinking polyhydroxy polyurethane resin according to claim 1; and
    another binder resin blended therewith.

8. An imitation leather comprising:
    a base fabric; and
    a resin composition comprising, as a principal component, the self-crosslinking polyhydroxy polyurethane resin according to claim 1, where the resin composition is impregnated in or laminated on the base fabric.

9. A skin material made of a thermoplastic polyolefin resin, comprising:
    a thermoplastic polyolefin resin sheet; and
    a top coat layer formed directly or via a primer layer on the sheet,
    wherein the top coat layer has been formed with a resin composition comprising, as a principal component, the self-crosslinking polyhydroxy polyurethane resin according to claim 1.

10. The skin material according to claim 9,
    wherein the self-crosslinking polyhydroxy polyurethane resin has been obtained by modifying, with the modifier, the polyhydroxy polyurethane resin, which is derived from the reaction of the 5-membered cyclic carbonate compound and the diamine compound, which is at least one compound selected from the group consisting of a diamine compound having only two primary amine groups as amine groups, aminoethylethanolamine, and hydroxyethylaminopropylamine.

11. The skin material according to claim 9,
    wherein the resin composition with which the top coat layer is formed further comprises a material, which comprises one fine powder or a combination of two or more fine powders selected from the group consisting of organic fine powders and inorganic fine powders, and which is added to the resin composition as a matting agent in a range from 1 to 150 parts by mass relative to 100 parts by mass of the self-crosslinking polyhydroxy polyurethane resin.

12. A weather strip material for coating and/or impregnating a high-molecular elastomer material to form a surface treatment layer at a slide contact portion that is brought into sliding contact with another part,
    wherein the weather strip material is a resin composition comprising:
        the self-crosslinking polyhydroxy polyurethane resin according to claim 1; and a material selected from the group consisting of a diorganopolysiloxane having an average polymerization degree in a range from 5,000 to 10,000, a silicone oil having a kinematic viscosity in a range from 100 to 10,000 CS, and a mixture thereof.

13. The weather strip material according to claim 12, wherein the self-crosslinking polyhydroxy polyurethane resin has been obtained by modifying, with the modifier, the polyhydroxy polyurethane derived from the reaction of the 5-membered cyclic carbonate compound and the diamine compound, which is at least one compound selected from the group consisting of a diamine compound having only two primary amine groups as amine groups, aminoethylethanolamine, and hydroxyethylaminopropylamine.

14. The weather strip material according to claim 12, wherein the resin composition comprises the self-crosslinking polyhydroxy polyurethane resin and the material ratio of the material in a range from 1 to 100 parts by mass relative to 100 parts by mass of the self-crosslinking polyhydroxy polyurethane resin.

15. The weather strip material according to claim 12, wherein the resin composition further comprises an additive comprising one fine powder or a combination of two or more fine powders selected from the group consisting of organic fine powders and inorganic fine powders, and
the additive is added in a range from 1 to 150 parts by mass relative to 100 parts by mass of the self-crosslinking polyhydroxy polyurethane resin.

16. The resin according to claim 1, wherein the modifier is a reaction product of a masking agent and an organic polyisocyanate compound,
the organic polyisocyanate compound is an aliphatic or aromatic polyisocyanate compound or an adduct of an aliphatic or aromatic polyisocyanate compound with other compound,
the masking agent is at least one compound selected from the group consisting of alcohol-based compounds, phenol-based compounds, active methylene-based compounds, acid amide-based compounds, imidazole-based compounds, urea-based compounds, oxime-based compounds, and pyridine-based compounds.

* * * * *